(12) United States Patent
Lake et al.

(10) Patent No.: US 11,659,067 B2
(45) Date of Patent: *May 23, 2023

(54) WIRELESS CONFIGURATION AND PROGRAMMING OF AUTOMOTIVE AFTERMARKET PERIPHERAL INTERFACING MODULES

(71) Applicant: AAMP of Florida, Inc., Clearwater, FL (US)

(72) Inventors: Michael Lake, Seminole, FL (US); Nathaniel Lee Wincek, New Port Richey, FL (US)

(73) Assignee: AAMP of Florida, Inc., Clearwater, FL (US)

( * ) Notice: Subject to any disclaimer, the term of this patent is extended or adjusted under 35 U.S.C. 154(b) by 63 days.

This patent is subject to a terminal disclaimer.

(21) Appl. No.: 17/103,561

(22) Filed: Nov. 24, 2020

(65) Prior Publication Data

US 2021/0084122 A1 Mar. 18, 2021

Related U.S. Application Data

(63) Continuation-in-part of application No. 16/021,534, filed on Jun. 28, 2018, now Pat. No. 10,848,600.
(Continued)

(51) Int. Cl.
*H04L 69/08* (2022.01)
*H04L 69/18* (2022.01)
(Continued)

(52) U.S. Cl.
CPC ............. *H04L 69/08* (2013.01); *H04L 12/66* (2013.01); *H04L 67/12* (2013.01); *H04L 69/18* (2013.01); *H04L 69/22* (2013.01); *H04L 69/24* (2013.01)

(58) Field of Classification Search
CPC .......... H04W 4/40; H04W 4/44; H04W 4/60; H04W 4/50; H04L 67/1097; H04L 67/025;
(Continued)

(56) References Cited

U.S. PATENT DOCUMENTS 7,046,638 B1  5/2006  Klausner et al.
9,684,500 B2 * 6/2017  Margol .................... G06F 8/61
(Continued)

*Primary Examiner* — Yee F Lam
(74) *Attorney, Agent, or Firm* — Michael Best & Friedrich LLP

(57) ABSTRACT

A method of bridging incompatibility of a radio head unit in a vehicle and a peripheral device configured to control a peripheral device in the vehicle. The method comprises receiving, from a first image sensor, a first scanned code identifying the vehicle, and receiving, from the first image sensor or a second image sensor, a second scanned code identifying the radio head unit. Based on the first scanned code, identifying a first communication protocol used by the peripheral device. Based on the second scanned code, identifying a second communication protocol used by the radio head unit. Based on the first communication protocol and the second communication protocol, determining a communication configuration ID identifying a target information exchange protocol executable to bridge the incompatibility between the first communication protocol and the second communication protocol. Additionally, the method includes the step of transmitting the communication configuration ID to an interface module, where the interface module is configured to execute the identified information exchange protocol to bridge the incompatibility between the first communication protocol and the second communication protocol.

24 Claims, 19 Drawing Sheets

Related U.S. Application Data

(60) Provisional application No. 62/526,419, filed on Jun. 29, 2017.

(51) Int. Cl.
 *H04L 69/24* (2022.01)
 *H04L 69/22* (2022.01)
 *H04L 12/66* (2006.01)
 *H04L 67/12* (2022.01)

(58) Field of Classification Search
 CPC ......... H04L 67/12; H04L 69/08; H04L 69/18; G07C 5/008; H04M 3/42136; H04M 1/6091; H04M 1/6083; H04M 2250/02; H04B 1/205; H04B 1/082; H04B 1/20; H04H 20/62; G01C 21/36; H04N 5/84; B60R 16/023
 See application file for complete search history.

(56) References Cited

U.S. PATENT DOCUMENTS

| | | |
|---|---|---|
| 2003/0139179 A1 | 7/2003 | Fuchs et al. |
| 2003/0167345 A1* | 9/2003 | Knight .................. H04L 12/46 701/1 |
| 2004/0249526 A1 | 12/2004 | Hauer et al. |
| 2005/0239434 A1 | 10/2005 | Marlowe |
| 2006/0045115 A1 | 3/2006 | Nix et al. |
| 2007/0015486 A1 | 1/2007 | Marlowe |
| 2007/0038434 A1* | 2/2007 | Cvetko ................ G06F 1/1632 703/23 |
| 2007/0293183 A1 | 12/2007 | Marlowe |
| 2008/0299899 A1* | 12/2008 | Wolfe .................. H04B 1/3805 455/15 |
| 2014/0164579 A1 | 6/2014 | Douthitt |
| 2014/0378055 A1* | 12/2014 | Pal ........................ H04W 8/005 455/41.2 |
| 2015/0312380 A1* | 10/2015 | Sauerbrey .............. H04W 4/44 455/426.1 |
| 2018/0339662 A1 | 11/2018 | Wincek et al. |

* cited by examiner

WIRELESS CONFIGURATION AND PROGRAMMING OF AUTOMOTIVE AFTERMARKET PERIPHERAL INTERFACING MODULES

CROSS-REFERENCE TO RELATED APPLICATIONS

This application is a continuation-in-part of U.S. patent application Ser. No. 16/021,534, filed on Jun. 28, 2018, which claims priority to U.S. Provisional Application No. 62/526,419, filed Jun. 29, 2017, the entire contents of each are incorporated by reference herein.

FIELD OF TECHNOLOGY

Aspects of the disclosure relate to integration of devices in a vehicle. Specifically, aspects of the disclosure relate to integrating devices that have mismatched or incompatible communication protocols.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1A:
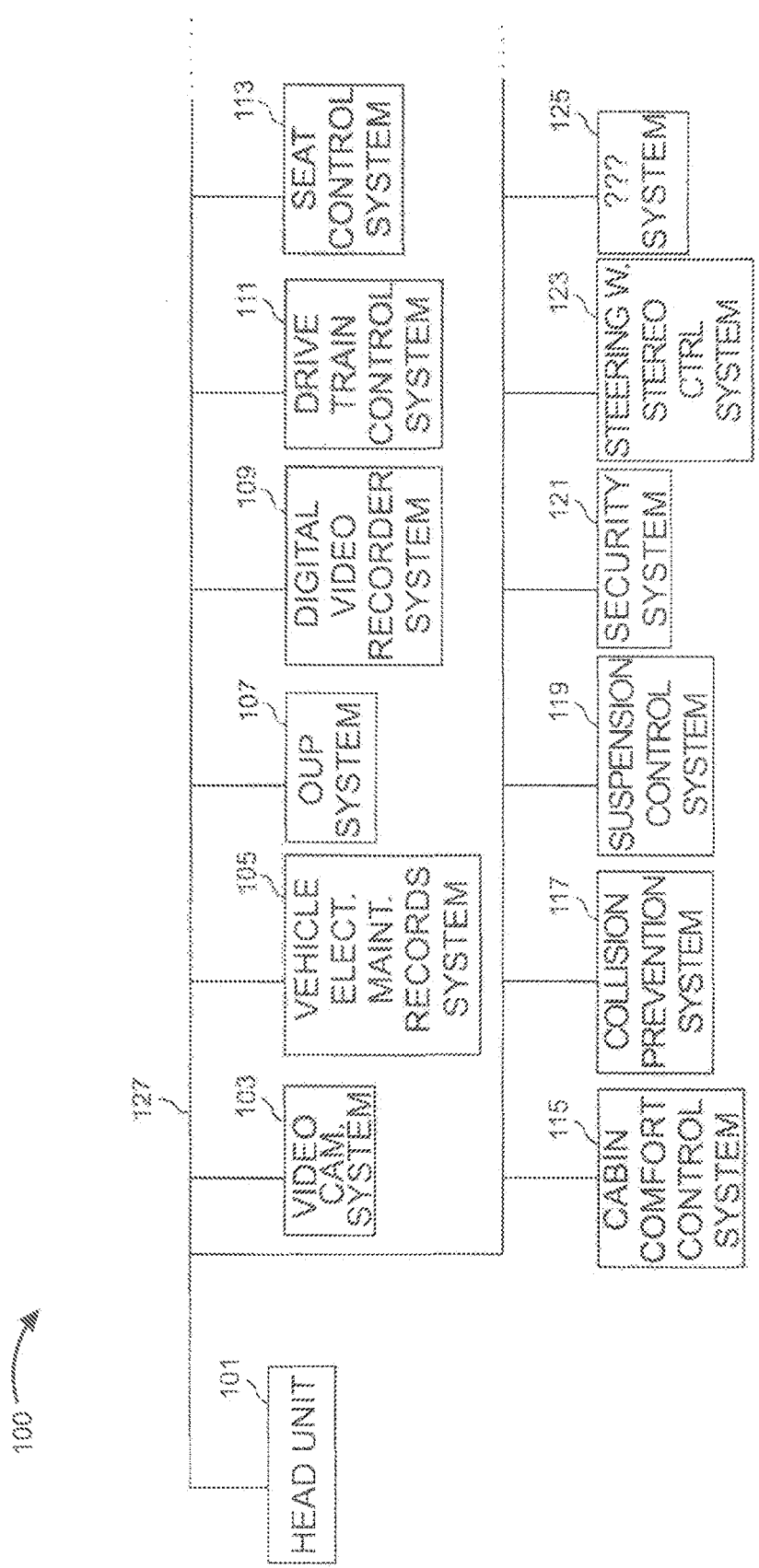
FIG. 1A shows illustrative apparatus in accordance with principles of the disclosure.

Vehicles are typically provided with a communication system for communicating with and controlling devices and sensors from different vehicular systems, including passenger amenity systems. A vehicle may be any suitable vehicle. Exemplary vehicles may include a car, boat, truck, plane, construction equipment and motorcycle. A radio head unit typically includes a radio receiver, an amplifier, and a user interface by which a vehicle driver may select and adjust audio or visual entertainment signals. The interface may include a graphical user interface. The interface may include a user voice interface.

It should be noted that a plurality of hardware and software based devices, as well as a plurality of different structural components may be utilized to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. As such, it should be noted that a plurality of hardware and software based devices, as well as a plurality of different structural components may be utilized to implement the invention. For example, "controller," "control unit," and "processor" described in the specification can include one or more processors, one or more memory modules including non-transitory computer-readable medium, one or more input/output interfaces, and various connections (for example, a system bus) connecting the components. Furthermore, and as described in subsequent paragraphs, the specific configurations illustrated in the drawings are intended to exemplify embodiments of the invention and that other alternative configurations are possible. In some instances, the controllers, processors, and modules may be implemented as one or more of general purpose processors, digital signal processors DSPs), application specific integrated circuits (ASICs), and field programmable gate arrays (FPGAs) that execute instructions or otherwise implement their functions described herein.

The head unit typically includes programmed logic. The head unit typically includes programmable logic. The head unit typically includes machine-readable memory. The head unit may function as a central processor. The head unit may be an OEM head unit. The head unit may be an aftermarket head unit.

The head unit typically is in communication through the communication system with peripheral processors that are typically dedicated to a vehicle device or system. A peripheral device may be an OEM peripheral device. The peripheral device may be an aftermarket peripheral device.

TABLE 1

Illustrative peripheral device.
Illustrative peripheral device

Video Camera System
Vehicle Electronic Maintenance Records System
Unattended Occupant Protection System ("UOPS")
Digital Video Recorder System
Drive Train Control System
Seat Control System
Cabin Comfort Control System (may control, for example, internal lighting, climate and any other suitable amenities)
Collision Prevention System
Suspension/Performance Control System
Security System
Steering Wheel Control System (for controlling peripherals from controls on steering wheel)

When a head unit and a peripheral use communication protocols that are different from each other, the peripheral and the head unit may be unable to communicate with each other. The different protocols may be incompatible with each other.

Apparatus and methods are provided for bridging incompatibility of a head unit and one or more peripheral devices. Any suitable peripherals may be used in accordance with the principles of the disclosure. Apparatus may include an interface. The interface may include an information exchange protocol. The information exchange protocols interface, when executed by the interface, may translate between different protocols.

Apparatus may include a system for communicating with and controlling devices and sensors in a vehicle. The system may include a radio head unit. The radio head unit may be an aftermarket head unit. The radio head unit may be an original equipment manufacturer ("OEM") radio head unit.

The radio head unit may be configured to communicate using a first communication protocol. The system may include a peripheral device configured to communicate using a second communication protocol. The second protocol used by the peripheral device may be incompatible with the first communication protocol used by the head unit.

The peripheral device may include a peripheral processor that controls one or more functions of the device. The peripheral processor may be dedicated to a specific device or vehicle system. The dedicated peripheral processor may be embedded in an aftermarket component installed in the vehicle. A peripheral device may be an OEM peripheral device. The peripheral device may be an aftermarket peripheral device.

The system may include a vehicle communication system. The vehicle communication system may include a system bus or one or more non-bus communication system channels. The vehicle communication system may be configured to move data between the radio head unit and one or more peripheral devices.

The system may include a programmable interface (or interface module or electronic processor). The programmable interface may be configured to bridge the incompatibility of the radio head unit and peripheral device. The programmable interface may provide functionality that allows the radio head unit to control a peripheral device using the vehicle communication system.

The programmable interface may include communication ports. The communication ports may allow the interface to connect and communicate with one or more vehicle components or systems. The programmable interface may include a first communication port. The first communication port may be used by the interface to communicate (receive and/or transmit data) with the radio head unit. The programmable interface may include a second communication port. The second communication port may be used by the interface to communicate (receive and/or transmit data) with a peripheral device. One or both of the first communication port and the second communication port may be a wireless communication port. The wireless communication portion may communicate via the any of the wireless communication systems identified in Table 2 or Table 3, provided below.

The programmable interface may include a third communication port. The third communication port may be used by the interface to access and communicate (receive and/or transmit data) with a mobile device. The third communication port may be a wireless communication port. The wireless communication portion may communicate via the any of the wireless communication systems identified in Table 2 or Table 3, provided below. Aside for a connection established by the interface, the mobile device may not be connected to, or accessible by, other vehicle systems. The mobile device may not be installed in the vehicle. The mobile device may be outside the vehicle.

The programmable interface may be configured to bridge incompatibility between a peripheral device and head unit without pre-programming the interface prior to installation in the vehicle. For example, the interface may be self-configurable after being installed in the vehicle. In other embodiments, the programmable interface may be partially pre-programmed and may include at least a portion of a target information exchange protocol(s) executable to bridge the incompatibility between the first communication protocol and the second communication protocol. The programmable interface may receive a configuration ID identifying which target information exchange protocol may be executed to bridge the communication between the first communication protocol and the second communication protocol.

After being installed in the vehicle, the interface may use the first communication port to identify the first communication protocol used by the radio head unit. After being installed in the vehicle, the interface may use the second communication port to identify the second communication protocol used by a peripheral device. After being installed in a vehicle, the interface may use the third communication port to detect presence of the mobile device outside the vehicle.

The interface may identify one or both of the first communication protocol and the second communication protocol through a variety of different methods. Although the methods may be described with respect to one of the communication protocols, it should be understood that the methods described herein may be used to determine any of the communication protocols.

Figure 17:
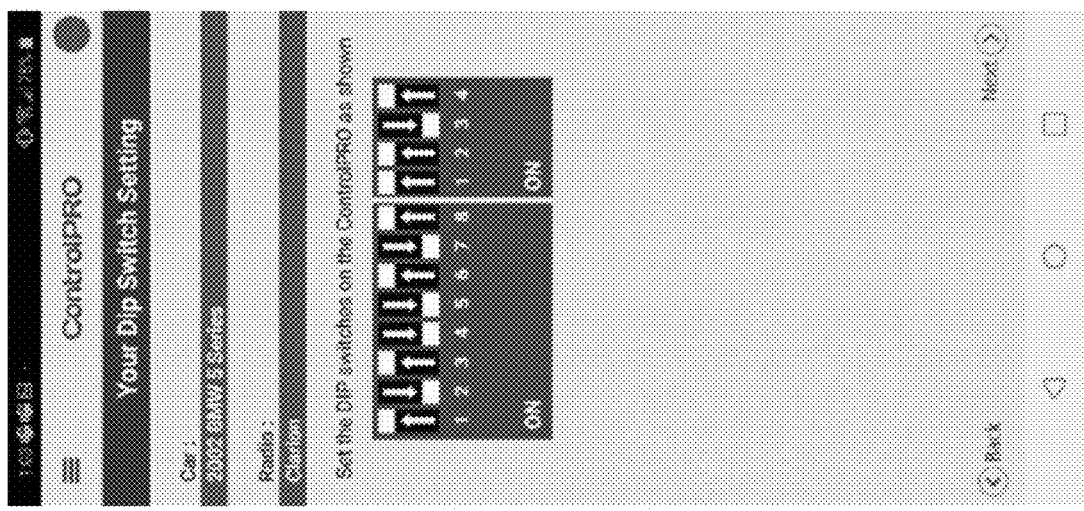
FIG. 17 illustrates a user interface on a mobile device providing a DIP switch arrangement in accordance with principles of the disclosure.

In one embodiment, the interface may determine the first communication protocol or the second communication protocol by receiving user inputs indicative of the configuration settings (see Table 5 provided below) of the vehicle, the peripheral device, the radio head unit, or a combination thereof. Likewise, the interface may determine the first communication protocol or the second communication protocol by receiving user inputs indicative of the firmware version (see Table 5) within the vehicle, the peripheral device, the radio head unit, or a combination thereof. For example, the interface may determine the first communication protocol or the second communication protocol by receiving a plurality of signals from DIP switches, which are arranged by a user. The signals from the DIP switches may be indicative of the vehicle configuration settings or the version of the firmware. The interface my utilize the signals from the DIP switches to identify the first communication protocol or the second communication protocol. In some embodiments, a user may set the DIP switches based on instructions provided via an application ("an app") on a mobile device. For example, as shown in FIG. 17, the user may be instructed to set the DIP switches as shown in a user interface provided by the application on the mobile device.

Figure 18:
FIG. 18 illustrates a user interface on a mobile device for receiving user inputs in accordance with principles of the disclosure.

In one embodiment, the interface may determine the first communication protocol or the second communication protocol by receiving user inputs via a user interface displayed on a mobile device. The user interface may be provided by the application on a mobile device. For example, as shown in FIG. 18, a user may provide inputs via the user interface on the application.

With respect to the radio head unit, the user inputs may include any of the information included in Table 4 (below), such as the peripheral make, peripheral model, peripheral version number, peripheral default settings, peripheral setting, or peripheral status. For example, a user input may include a model number of the radio head or a product number of the radio head. Furthermore, the user input used by the interface to identify the first communication protocol may include a scanned code. The scanned code may include a barcode, a produce number, or a model number. The interface may then identify the first communication protocol based on the user inputs.

With respect to the peripheral device, the user inputs may include any of the information included in (Table 6), such as a vehicle make, a vehicle model, vehicle data bus serial number, vehicle data bus controller version number. The user input may also include vehicle information such as a year or a vehicle identification number (VIN). Furthermore, the user input used by the interface to identify the first communication protocol may include a scanned code. The scanned code may be the VIN, a barcode, or one of the other vehicle identifiers.

The user inputs used to identify the first communication protocol or the second communication protocol may be input via one or more dropdown menu or entry within the user interface (i.e., the app) on the mobile device. Furthermore, the user inputs may be input by scanning a code via a camera or image sensor on the mobile device. The scanned image may then be input via the user interface on the mobile device.

When receiving inputs from a user interface displayed on the mobile device, the interface may communicate with the mobile device via hardwire or wireless communication. More specifically, the interface may communicate with the mobile device via any of the methods provided in Table 2 or Table 3 (below). For example, the interface may communicate with the mobile device via a wire, a coaxial cable, a fiber optic cable infrared, WiFi, Bluetooth, Bluetooth-low energy, or near-field communication (NFC).

In some embodiments, the interface may be configured to harvest power from a battery of the vehicle to communicate with the mobile device. The interface may harvest power from the battery even if the engine of the vehicle is not running. In addition to, or alternatively, the interface may be configured to harvest power from the mobile device to communicate with the mobile device. The programmable interface may be configured to communicate with the mobile device outside the vehicle using a wired or a wireless communication channel. For example, the interface may utilize a Bluetooth, WiFi channel, or Near Field Communication (NFC) to communication with the mobile device. The interface may include a wireless transceiver or other hardware for communicating with the mobile device.

In response to detecting the mobile device, the interface may initiate a data connection with the mobile device. Alternatively, the mobile device may initiate the connection with the interface. Via the mobile device, the interface may gain access to a remote network.

The remote network may provide access to information that may be utilized to bridge the incompatibility of the first communication protocol and the second communication protocol. For example, the remote network may provide access to a target information exchange protocol, which may be executed to bridge the incompatibility between the first communication protocol and the second communication protocol. In some embodiments, the target information exchange protocol may be downloaded from the remote network on to the interface. In addition to, or alternatively, the remote network may provide access to a communication configuration ID, which indicates which target information exchange protocol may be used to bridge the incompatibility between the first communication protocol and the second communication protocol. In other words, the target information exchange protocol may include executable code or instructions to bridge the incompatibility between the first communication protocol and the second communication protocol, while the communication configuration ID may be used to inform the interface which target information exchange protocol should be executed.

Accordingly, the interface may receive or download the target information exchange protocol, the communication configuration ID, or both via the remote network. For example, in some embodiments, the interface may store a plurality of target information exchange protocols locally on the interface, and the interface may receive a communication configuration ID via the remote network instructing the interface which of the plurality of target information exchange protocols to execute. In some embodiments, one or both of the target information exchange protocol or the communication configuration ID may be obtained from a local memory on the mobile device.

Additionally, the remote network may provide access to one or more database that may be utilized by either the mobile device or the interface to complete the functions described herein. For example, the database may include more or more table include vehicle information, radio head unit information, or wiring information of the peripheral or the radio head unit, The database may also include information related to button functions of the radio head unit or the peripheral device. The database may further include tables mapping information related to the vehicle, the peripheral device, or the radio head unit to a communication protocol. For example, the database may include tables mapping information related to the radio head unit to a first communication protocol. The database may include tables mapping information related to the vehicle or the peripheral device to a second communication protocol. Additionally, the database may include tables mapping the first communication protocol and the second communication protocol to a target information exchange protocol, which may be utilized to bridge the incompatibility of the first communication protocol and the second communication protocol.

In some embodiments, one or more of the databases described herein may be stored on the mobile device. For example, the mobile device may receive one or more database via the remote network. Likewise, the mobile device may receive one or more database update via the remote network.

The interface may communicate with the mobile phone or the remote network to obtain information indicating which target information exchange protocol to execute to bridge the incompatibility of the first communication protocol and the second communication protocol. The interface may search the remote network for a target information exchange protocol or a communication configuration ID. In some embodiments, the interface may send one or more user input to the remote network to help identify the target information exchange protocol. Alternatively, the interface may identify the first communication protocol or the second communication protocol based on the user inputs, and then may send one or both the first communication protocol or the second communication protocol to the remote network to help identify the target information exchange protocol. As previously mentioned, the target information exchange protocol may be determined based on a communication configuration ID. The interface may receive the configuration ID from the mobile phone or the remote network.

The target information exchange protocol may, when executed by the interface, translate between the first and second protocols.

The interface may download the target information exchange protocol found on the remote network. After obtaining the target information exchange protocol, the interface may disconnect from the mobile device and remote network. The interface may utilize the downloaded target information exchange protocol to bridge the incompatibility between the radio head unit and peripheral device.

Once the interface determines which target information exchange protocol may be utilized to bridge the incompatibility between the first communication protocol and the second communication protocol, the interface may execute the target information exchange protocol. For example, the interface may be configured to intercept information transmitted by the peripheral device using the second communication protocol. The interface may translate the intercepted information transmitted by the dedicated peripheral processor into the first protocol. The interface may push the information, now reformatted in the first communication protocol, onto the vehicle communication system.

The interface may be configured to intercept information transmitted by the radio head unit in the first communication protocol. The interface may translate the intercepted information transmitted by the radio head unit into the second protocol. The interface may push the information, now reformatted in the second communication, onto the vehicle communication system.

One or more of the functions described herein as being executed by the interface may instead be distributed to the mobile device or another electronic process or module to be executed. More specifically, the mobile device may be configured to execute any of the functions provided in Table 7 (below). For example, the mobile device may be responsible for retrieving one or more of the following: information from the vehicle, information from the peripheral device, or information from the remote server related to the vehicle or the peripheral device. As previously mentioned, the information received by the mobile device may be received in the form of user inputs from a mobile application. Furthermore, with continued reference to Table 7, the mobile device may be configured to do any of the following functions: download vehicle information or peripheral information from a remote server, install vehicle information in the peripheral, install peripheral information in the peripheral, select and display vehicle information or peripheral information, or update the peripheral software. Additionally, the information received by the mobile device or sent by the mobile device may alternatively be received by or sent by the remote network.

Furthermore, one or more of the functions executed by the mobile device may be executed either locally on the mobile device or with the assistance of the remote network or the interface. For example, the user inputs received by the mobile device may be used to determine a first communication protocol used by the radio head unit or a second communication protocol used by the peripheral device. In one embodiment, the first communication protocol and the second communication protocol may be identified locally on the mobile device based on the user inputs. In another embodiment, the mobile device may send information related to the user inputs to either the interface or the remote network, and in turn, the interface or the remote network may assist in identifying the first communication protocol and the second communication protocol. Similarly, the first communication protocol and the second communication protocol may be used to determine a configuration ID or a target exchange communication protocol. In one embodiment, the configuration ID or the target exchange protocol may be determined locally on the mobile device based on the first communication protocol and the second communication. In another embodiment, the mobile device may send information related to the first communication protocol and the second communication protocol to either the interface or the remote network, and in turn, the interface or the remote network may assist in identifying the a configuration ID or a target exchange communication protocol.

Apparatus may include a system for harmonizing communication and control of devices and sensors installed in a vehicle. The system may include a radio head unit. The radio head unit may communicate with other internal vehicle systems and/or sensors using a first communication protocol. The system may include a peripheral device that communicates with one or more other internal vehicle systems using a second communication protocol. The first and second protocols may be mismatched with each other.

Mismatched protocols may include protocols that are incompatible. For example, the peripheral device may not be able to process instructions received from the head unit formatted in the first communication protocol. The head unit may not be able to monitor status signals generated by the peripheral device in the second communication format.

The system may include an electronic communication link. The electronic communication link may carry data generated by the radio head unit to another vehicle component or sensor. The electronic communication link may carry data generated by the dedicated peripheral processor. The electronic communication link may carry data between two or more vehicle components.

The system may include a dynamically programmable interface. The interface may include a first communication port. The first communication port may monitor data traffic on the electronic communication link. The first communication port may be configured to intercept data generated by the radio head unit.

The interface may include a second communication port. The second communication port may monitor data traffic on the electronic communication link. The second communication port may be configured to intercept data generated by the dedicated peripheral processor.

The system may include an interface transceiver. The interface transceiver may provide hardware and/or software for accessing a communication network that is otherwise external to the vehicle. The interface transceiver may be removable from the interface. Using the transceiver, the interface may obtain a target information exchange protocol via the communication network. The target information exchange protocol, when executed by the interface, may bridge incompatibility of the radio head unit and dedicated peripheral processor.

The target information exchange protocol may translate intercepted data generated by the radio head unit into the second communication protocol that is used by the peripheral device. The target information exchange protocol may translate intercepted data generated by the dedicated peripheral processor into the second communication protocol.

A peripheral device may be one of a plurality of peripheral devices. The second communication protocol may be one of a plurality of second communication protocols. Each of the second communication protocols may be incompatible with the first communication protocol. Each of the plurality of second protocols may be associated with a different peripheral device installed in the vehicle.

A target information exchange may be one of a plurality of target information exchanges. The interface may be configured to obtain, from one or more networks external to the vehicle, the plurality of target information exchanges such that the interface dynamically self-configures to provide compatibility with each of the second protocols and the radio head unit.

For example, the interface may be configured to execute any one of the plurality of target information exchanges and translate data generated by any one of the plurality of peripheral devices into the first communication protocol utilized by the radio head unit. The interface may also be configured to translate data generated by the radio head unit into any one of the plurality of second communication protocols. The translating may bridge the incompatibility of radio head unit and the peripheral devices.

The interface may be configured to detect removal of the peripheral device from the vehicle. In response to detecting the removal, the interface may delete the target exchange protocol associated with the removed peripheral device. Removing the unneeded target exchange protocol may allow the interface to have a smaller memory for storing target exchange protocols. Removing the unneeded target exchange protocol may improve operation of the interface. Removing the unneeded exchange protocol may free up computational resources and thereby improve operation of needed exchange protocols.

The interface may include a third communication port. The third communication port may be used to access a mobile device outside the vehicle. For example, the third communication port may be a near field communication (NFC) port that enables wireless communication between the interface and the mobile device. The near field communication port may also enable wireless power transfer between the interface and the mobile device. The interface may be configured to harvest charge or current from the mobile device external to the vehicle. The interface may harvest enough charge to power access to a communication network accessible via the mobile device and otherwise external to the vehicle.

The interface may be configured to harvest charge or current from the mobile device to query the peripheral device and identify the second communication protocol. For example, the interface may harvest charge from the mobile device when the vehicle is not running. The interface may harvest charge or current using the transceiver.

The interface may be configured to harvest charge or current from an electrical system of the vehicle to power access to the communication network otherwise external to the vehicle. The interface may harvest charge from the vehicle whether or not the vehicle is running.

Methods for dynamically integrating, in a vehicle, an original equipment manufacturer ("OEM") head unit and an aftermarket peripheral device that is incompatible with the OEM head unit are provided. The methods may include installing an interface in the vehicle. Installing the interface may include linking the interface to a communication system of the vehicle.

Methods may include using the interface to identify a make, model and year of the vehicle. The interface may identify the make, model and year based on querying components of the vehicle accessible via the communication system. Methods may include identifying a unit model of the aftermarket peripheral device. Based on the unit model, the interface may determine a manufacturer of the aftermarket peripheral device. Based on the unit model, the interface may determine a communication protocol utilized by the aftermarket peripheral device.

Methods may include accessing a remote network. The remote network may be external to the vehicle. A network external to the vehicle may be a network that is not accessible (except via the interface) to other vehicle components via the communication system of the vehicle. Methods may include downloading software from the remote network. The software may be an information exchange protocol that reformats or translates information between two or more communication protocols. The software may be stored and executed by the interface.

The software may reformat communications generated by the OEM head unit. The interface may monitor the communication system of the vehicle for information generated by the OEM radio head unit. The software may reformat communications generated by the aftermarket peripheral device. The interface may monitor the communication system of the vehicle for information generated by the aftermarket peripheral device.

In response to detecting first information transmitted onto the communication system by the OEM head unit, the interface may execute the software and reformat the first information into a second communication protocol that is compatible with the aftermarket peripheral device. In response to detecting second information transmitted onto the communication system by the aftermarket peripheral device, the interface may execute the software to reformat the second information into a first communication protocol that is compatible with the OEM head unit.

After reformatting information the interface may push the reformatted information onto the vehicle communication system. The vehicle system may route the reformatted information to a destination identified in the information before it was intercepted by the interface.

Methods may include, using the interface, detecting a mobile device within a threshold distance of the interface. Methods may include connecting to a remote network using the mobile device. Methods may include locating a software update to the peripheral device. Methods may include downloading the software update. Methods may include installing the software update on the peripheral device.

An ability of the interface to connect to the remote network may improve the operation of a head unit and/or peripheral devices (aftermarket or OEM) installed in the vehicle by providing to access to network previously inaccessible to those components after they are installed in a vehicle. An ability of the interface to more frequently connect to the remote network may improve the operation of head unit and/or peripheral devices installed in the vehicle by providing more frequent and autonomous software updates for those components.

Methods may include using the interface, harvesting power from the mobile device to communicate with the mobile device.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Apparatus embodiments may include features that are neither shown nor described in connection with the illustrative apparatus. Features of illustrative apparatus may be combined. For example, an illustrative embodiment may include features shown in connection with another illustrative embodiment.

FIG. 1A shows illustrative arrangement 100 of components that may be installed in a vehicle. Arrangement 100 includes head unit 101. Head unit 101 is connected to vehicle communication system 127. Vehicle communication system 127 may provide communication links and protocols for transferring information between vehicle components shown in arrangement 101.

Arrangement 100 includes peripheral devices 103 (video camera system), 105 (vehicle electrical maintenance records system), 107 (unattended occupant protection system), 109 (digital video recorder system), 111 (drive train control system), 113 (seat control system), 115 (cabin comfort control system), 117 (collision prevention system), 119 (suspension control system), 121 (security system), 123 (steering wheel stereo control system), 125 (any other suitable devices).

Figure 1B:
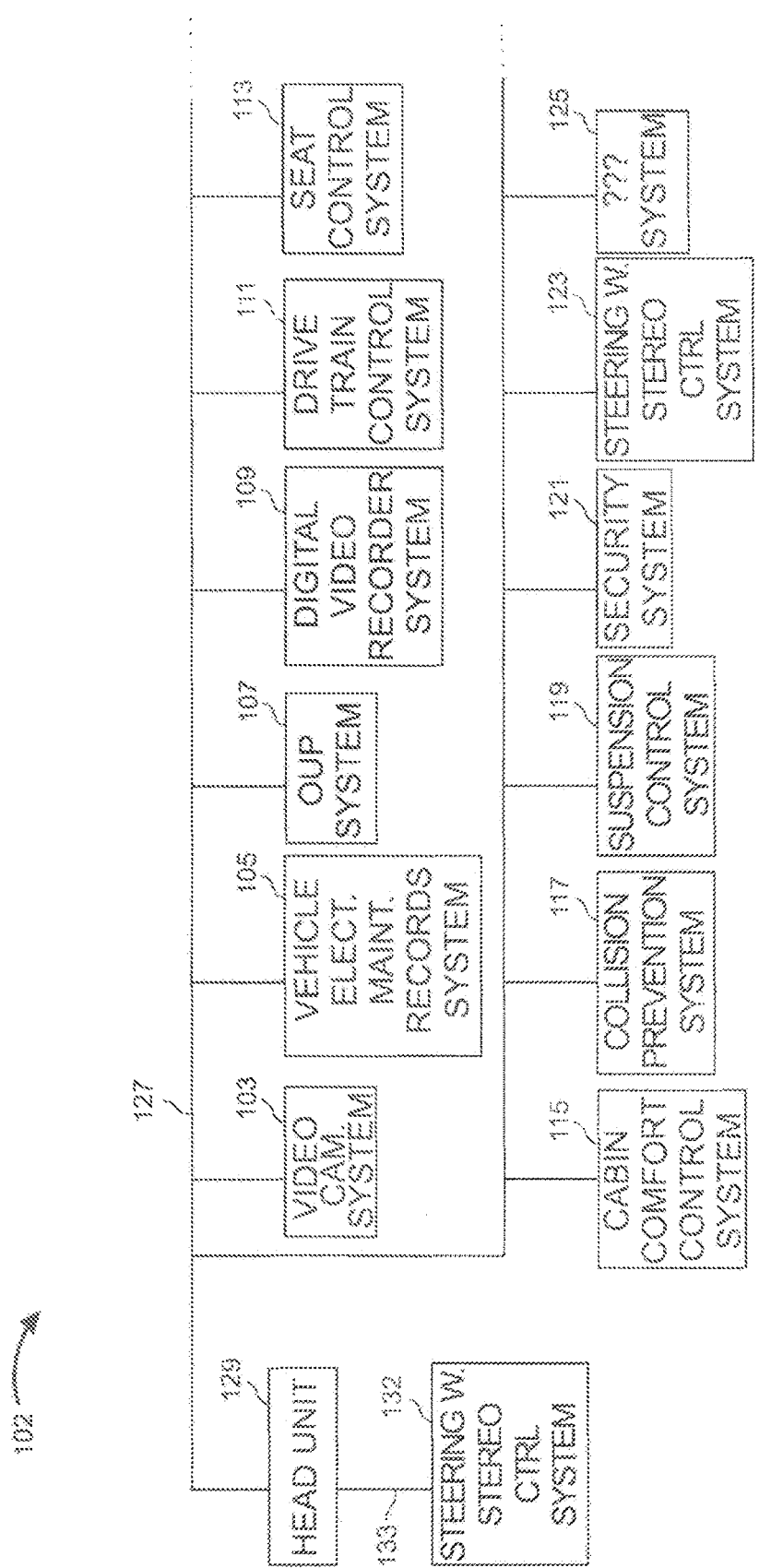
FIG. 1B shows illustrative apparatus in accordance with principles of the disclosure.

FIG. 1B shows illustrative arrangement 102 of components that may be installed in a vehicle. Arrangement 102 includes components 103-125 (shown above in FIG. 1A). Arrangement 102 includes vehicle communication system 127 (also shown above in FIG. 1A).

Arrangement 102 includes head unit 129. Head unit 129 may include one or more features of head unit 101 (shown in FIG. 1A). Arrangement 102 shows that steering wheel control module 131 is in direct communication with head unit 129 via channel 133. Steering wheel control module 131 may include one or more features of steering wheel control module 123. In some embodiments, a vehicle may only include steering wheel control module 131.

Channel 133 may be a non-bus channel vehicle communication system 127. A vehicle communication system, such as communication system 127, may include one or more interconnected channels. Table 2 lists illustrative vehicle communication system channels.

TABLE 2

| Illustrative vehicle communication system channels. Illustrative vehicle communication system channels |
|---|
| Wire |
| Infrared |
| Wi-Fi |
| Bluetooth |
| Bluetooth-low energy |
| Coaxial cable |
| Fiber optic cable |

Any other suitable vehicle communication system channels may be used in accordance with the principles of the disclosure. A channel may provide communication using one or more protocols. A protocol may be a bus protocol. A vehicle may include one or more bus protocols. One or more of the peripherals may be in communication with one or more of the head unit, another peripheral and the vehicle data bus via a communication system channel. One or more of the peripherals may be in communication with one or more of the head unit and other peripherals via the vehicle data bus.

When an aftermarket ("AM") head unit or an AM peripheral device replaces an original equipment manufacturer ("OEM") head unit or an OEM peripheral device, respectively, there may be a mismatch between AM and OEM protocols. The mismatch may be overcome using an interface that translates between the protocols. The interface may include communication ports. The communication ports may allow the interface to connect and communicate with one or more vehicle components or systems. The interface may include a first communication port. The first communication port may be used by the interface to communicate (receive and/or transmit data) with the radio head unit. The interface may include a second communication port. The second communication port may be used by the interface to communicate (receive and/or transmit data) with a peripheral device. One or both of the first communication port and the second communication port may be a wireless communication port. The wireless communication portion may communicate via the any of the wireless communication systems identified in Table 2 above.

A vehicle power circuit in a vehicle electrical system typically provides operating power to head units and peripherals. Apparatus and methods are provided for a technician to communicate with the interface. The apparatus and methods may include or involve an interface device. The apparatus and methods may include or involve interface software and/or an electronic processor. The apparatus and methods may include logic for controlling a peripheral. The apparatus and methods may include one or more of hardware, firmware and software for exchanging vehicle peripheral information with a peripheral. The apparatus and methods may include one or more of hardware, firmware and software for changing or updating settings of a peripheral. The apparatus and methods may include one or more of hardware, firmware and software for querying settings of a peripheral. The apparatus and methods may include one or more of hardware, firmware and software for translating between the protocols.

The apparatus and methods may include the use of a mobile communication device to communicate with an interface. The apparatus and methods may include or involve a mobile communication device application for interacting with the interface. The interface may include a third communication port. The third communication port may be used by the interface to access and communicate (receive and/or transmit data) with the mobile device. The third communication port may be a wireless communication port. In some embodiments, the interface utilizes near field communication to communicate with the mobile phone.

The mobile communication device may communicate with the interface by wired or wireless implementations. Table 3 shows illustrative examples of wireless communication implementations.

TABLE 3

Illustrative wireless communication implementations.
Illustrative wireless communication implementations Near-field communication
Infrared
Wi-Fi
Bluetooth
Bluetooth-low energy Any other suitable implementations may be used in accordance with the principles of the disclosure. Apparatus and methods may include harvesting power from the electrical system to power transmission and reception of vehicle peripheral information to and from the interface. In some embodiments, the interface may wirelessly harvest power from the mobile phone. In this embodiment, the interface may be set up or programmed without having to rely on power from the vehicle. In other words, a user may program or partially program the interface to bridge an incompatibility in communication protocols between the vehicle peripheral device and the radio head unit without relying upon power from the vehicle. Programing the interface may include identifying a first communication protocol utilized by the peripheral device of the vehicle, identifying a second communication protocol utilized by the radio head unit, and identifying a target information exchange protocol, which may be used to bridge the incompatibility between the first communication protocol and the second communication protocol. Once the target information exchange protocol is determined and the interface is programmed to bridge the incompatibility between the communication protocols, the interface may later rely upon power from the vehicle to continue to execute a target information exchange protocol to bridge the incompatibility.

Systems and methods may include an interface configured to bridge incompatibility between a peripheral device and head unit without pre-programming the interface prior to installation in the vehicle. For example, the interface may be self-configurable after being installed in the vehicle. In other embodiments, the interface may be partially pre-programmed and may include at least a portion of a target information exchange protocol(s) executable to bridge the incompatibility between the first communication protocol and the second communication protocol. The interface may receive a configuration ID identifying which target information exchange protocol may be executed to bridge the communication between the first communication protocol and the second communication protocol.

After being installed in the vehicle, the interface may use the first communication port to identify the first communication protocol used by the radio head unit. After being installed in the vehicle, the interface may use the second communication port to identify the second communication protocol used by a peripheral device. The system and method may include obtaining one or more pieces of data identified in Tables 4-7 to help identify the first communication protocol or the second communication protocol.

Figure 20:
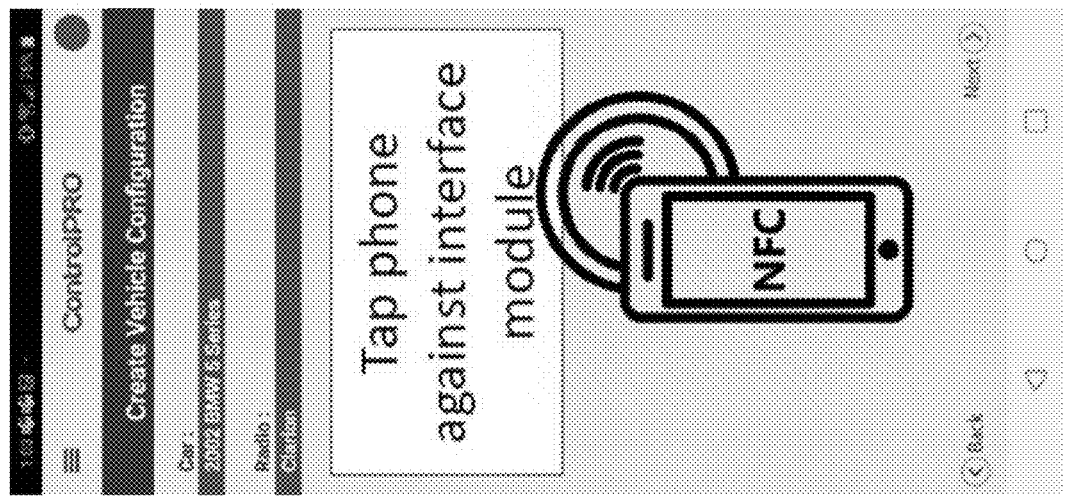
FIG. 20 illustrates a user interface on a mobile device to enable wireless communication in accordance with principles of the disclosure.
Figure 19:
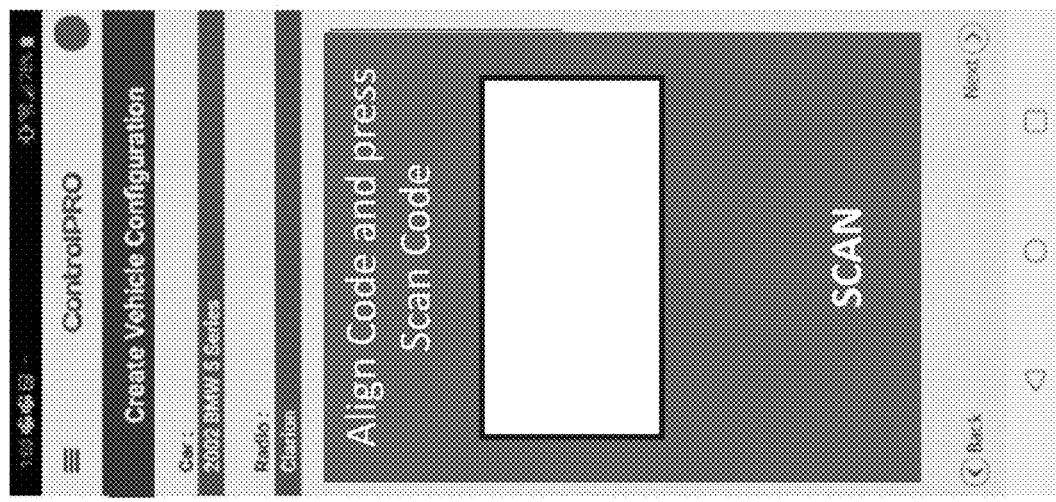
FIG. 19 illustrates a user interface on a mobile device for scanning codes related to a head unit, a vehicle, or a peripheral device in accordance with principles of the disclosure.

The system and method may include utilizing a user interface on a mobile device to help obtain the data identified in Tables 4-7. For example, the interface may use the third communication port to detect presence of the mobile device outside the vehicle. The mobile device may then send or receive the data provided in Tables 4-7 to help identify the first communication protocol and the second communication protocol. The mobile device may also assist in ultimately determining a target information exchange protocol to bridge the incompatibility. For example, in some embodiments, the data provided in Tables 4-7 may be input via an application on the mobile phone, as shown in FIGS. 18-20.

Tables 4-6 identify illustrative information that the mobile device may transmit to, or receive from, an interface. For example, the user inputs may include any of the information included in Table 4 (below), such as the peripheral make, peripheral model, peripheral version number, peripheral default settings, peripheral setting, or peripheral status. Similarly, with respect to the radio head unit, a user input may include a model number of the radio head or a product number of the radio head. Furthermore, the user input used by the interface to identify the first communication protocol may include a scanned code. The scanned code may include a barcode, a produce number, or a model number. The interface may then identify the first communication protocol based on the user inputs.

TABLE 4

Illustrative vehicle peripheral information.
Illustrative vehicle peripheral information Peripheral make
Peripheral model
Peripheral version number
Peripheral default settings
Peripheral setting
Peripheral status Any other suitable peripheral information may be used in accordance with the principles of the disclosure.

Referring to Table 5, the interface may determine the first communication protocol or the second communication protocol by receiving user inputs indicative of the configuration settings of the vehicle, the peripheral device, the radio head unit, or a combination thereof. Likewise, the interface may determine the first communication protocol or the second communication protocol by receiving user inputs indicative of the firmware version within the vehicle, the peripheral device, the radio head unit, or a combination thereof. For example, the interface may determine the first communication protocol or the second communication protocol by receiving a plurality of signals from DIP switches, which are arranged by a user. The signals from the DIP switches may be indicative of the vehicle configuration settings or the version of the firmware. The interface my utilize the signals from the DIP switches to identify the first communication protocol or the second communication protocol. In some embodiments, a user may set the DIP switches based on instructions provided via an application ("an app") on a mobile device. For example, as shown in FIG. 17, the user may be instructed to set the DIP switches as shown in a user interface provided by the application on the mobile device.

TABLE 5

| Illustrative interface information. |
| --- |
| Illustrative interface information |
| Configuration settings |
| Firmware version information |

Any other suitable interface information may be used in accordance with the principles of the disclosure.

With respect to the peripheral device, the user inputs may include any of the information included in (Table 6), such as a vehicle make, a vehicle model, vehicle data bus serial number, vehicle data bus controller version number. The user input may also include vehicle information such as a year or a vehicle identification number (VIN). Furthermore, the user input used by the interface to identify the first communication protocol may include a scanned code. The scanned code may be the VIN, a barcode, or one of the other vehicle identifiers.

TABLE 6

| Illustrative vehicle information. |
| --- |
| Illustrative vehicle information |
| Vehicle make |
| Vehicle model |
| Vehicle data bus serial number |
| Vehicle data bus controller version number |

Any other suitable vehicle information may be used in accordance with the principles of the disclosure.

The user inputs used to identify the first communication protocol or the second communication protocol, such as those provided in Tables 4-6, may be input into the mobile device. For example, the inputs may be input via one or more dropdown menu or entry within the user interface (i.e., the app) on the mobile device, as shown in FIG. 18. Furthermore, as shown in FIG. 19, the user inputs may be input by scanning a code via a camera or image sensor on the mobile device. The scanned image may then be input via the user interface on the mobile device.

In some embodiments, the mobile device may automatically identify data, such as the data provided in Tables 4-6. For example, as shown in Table 7, the mobile device may request and/or retrieve information from the interface via the first communication port, the second communication port, or the third communication port. Similarly, the mobile device may request and/or retrieve information from a remote network. Furthermore, in some embodiments, the mobile phone may execute other functions, such as downloading information, installing information, displaying information, or updating software. Table 7 provides some examples of functions that may be executed with the assistance of the mobile phone. For example, the mobile phone may download vehicle or peripheral information from a remote network. Similarly, the mobile phone may install vehicle or peripheral information on the peripheral device, on the interface, or within the mobile device itself. The mobile phone may also install updates on the peripheral device, on the interface, or within the mobile device itself.

Table 7 lists illustrative user functions that may be executed from a mobile device that is in communication with a peripheral interface.

| Illustrative user functions. |
| --- |
| Illustrative user functions |
| Retrieve vehicle information from vehicle |
| Retrieve peripheral information from peripheral |
| Retrieve vehicle information from remote server |
| Retrieve peripheral information from remote server |
| Download vehicle information from remote server |
| Download peripheral information from remote server |
| Install vehicle information in peripheral |
| Install peripheral information in peripheral |
| Select and display vehicle information |
| Select and display peripheral information |
| Update peripheral software |

Any other suitable user functions may be used in accordance with the principles of the disclosure.

Once the user inputs are received by the interface and/or the mobile phone, the system and method includes identifying the first communication protocol used by the radio head unit and the second communication protocol used by the peripheral device. The interface and mobile phone may communicate by sending and or receiving data obtained from the user inputs between one another. The interface and the mobile phone may also communication with a remote network to send data obtained from the user inputs or obtain additional information. For example, the interface and the mobile phone may work together and/or with a remote network to identify the first communication protocol of the radio head unit and the second communication protocol of the peripheral device. Furthermore, once the first communication protocol and the second communication protocol are identified, the interface and the mobile phone may determine a target information exchange protocol to bridge the incompatibility between the first communication protocol and the second communication protocol. In addition to or alternatively, the interface and the mobile phone may determine a communication configuration ID, which in turn, identifies a target communication exchange protocol to bridge the incompatibility between the first communication protocol and the second communication protocol. The interface and the mobile phone may work together and/or with a remote network to determine the target communication exchange protocol.

When communication with the interface and/or the remote network, the mobile device may communication with via hardwire or wireless communication. More specifically, the interface may communicate with the mobile device via any of the methods provided in Table 2 or Table 3. For example, the interface may communicate with the mobile device via a wire, a coaxial cable, a fiber optic cable infrared, WiFi, Bluetooth, Bluetooth-low energy, or near-field communication (NFC).

The remote network may provide access to information that may be utilized to bridge the incompatibility of the first communication protocol and the second communication protocol. For example, the remote network may provide access to a target information exchange protocol, which may be executed to bridge the incompatibility between the first communication protocol and the second communication protocol. In some embodiments, the target information exchange protocol may be downloaded from the remote network on to the interface. In addition to, or alternatively, the remote network may provide access to a communication configuration ID, which indicates which target information exchange protocol may be used to bridge the incompatibility between the first communication protocol and the second communication protocol. In other words, the target information exchange protocol may include executable code or instructions to bridge the incompatibility between the first communication protocol and the second communication protocol, while the communication configuration ID may be used to inform the interface which target information exchange protocol should be executed.

Accordingly, the interface may receive or download the target information exchange protocol, the communication configuration ID, or both via the remote network. For example, in some embodiments, the interface may store a plurality of target information exchange protocols locally on the interface, and the interface may receive a communication configuration ID via the remote network instructing the interface which of the plurality of target information exchange protocols to execute. In some embodiments, one or both of the target information exchange protocol or the communication configuration ID may be obtained from a local memory on the mobile device.

Additionally, the remote network may provide access to one or more database that may be utilized by either the mobile device or the interface to complete the functions described herein. For example, the database may include more or more table include vehicle information, radio head unit information, or wiring information of the peripheral or the radio head unit, The database may also include information related to button functions of the radio head unit or the peripheral device. The database may further include tables mapping information related to the vehicle, the peripheral device, or the radio head unit to a communication protocol. For example, the database may include tables mapping information related to the radio head unit to a first communication protocol. The database may include tables mapping information related to the vehicle or the peripheral device to a second communication protocol. Additionally, the database may include tables mapping the first communication protocol and the second communication protocol to a target information exchange protocol, which may be utilized to bridge the incompatibility of the first communication protocol and the second communication protocol.

In some embodiments, one or more of the databases described herein may be stored on the mobile device. For example, the mobile device may receive one or more database via the remote network. Likewise, the mobile device may receive one or more database update via the remote network.

The interface may communicate with the mobile phone or the remote network to obtain information indicating which target information exchange protocol to execute to bridge the incompatibility of the first communication protocol and the second communication protocol. The interface may search the remote network for a target information exchange protocol or a communication configuration ID. In some embodiments, the interface may send one or more user input to the remote network to help identify the target information exchange protocol. Alternatively, the interface may identify the first communication protocol or the second communication protocol based on the user inputs, and then may send one or both the first communication protocol or the second communication protocol to the remote network to help identify the target information exchange protocol. As previously mentioned, the target information exchange protocol may be determined based on a communication configuration ID. The interface may receive the configuration ID from the mobile phone or the remote network. The interface may utilize the downloaded target information exchange protocol to bridge the incompatibility between the radio head unit and peripheral device.

One or more of the functions described herein as being executed by the interface may instead be distributed to the mobile device or another electronic process or module to be executed. More specifically, the mobile device may be configured to execute any of the functions provided in Table 7 (below). For example, the mobile device may be responsible for retrieving one or more of the following: information from the vehicle, information from the peripheral device, or information from the remote server related to the vehicle or the peripheral device. As previously mentioned, the information received by the mobile device may be received in the form of user inputs from a mobile application. Furthermore, with continued reference to Table 7, the mobile device may be configured to do any of the following functions: download vehicle information or peripheral information from a remote server, install vehicle information in the peripheral, install peripheral information in the peripheral, select and display vehicle information or peripheral information, or update the peripheral software. Additionally, the information received by the mobile device or sent by the mobile device may alternatively be received by or sent by the remote network.

Furthermore, one or more of the functions executed by the mobile device may be executed either locally on the mobile device or with the assistance of the remote network or the interface. For example, the user inputs received by the mobile device may be used to determine a first communication protocol used by the radio head unit or a second communication protocol used by the peripheral device. In one embodiment, the first communication protocol and the second communication protocol may be identified locally on the mobile device based on the user inputs. In another embodiment, the mobile device may send information related to the user inputs to either the interface or the remote network, and in turn, the interface or the remote network may assist in identifying the first communication protocol and the second communication protocol. Similarly, the first communication protocol and the second communication protocol may be used to determine a configuration ID or a target exchange communication protocol. In one embodiment, the configuration ID or the target exchange protocol may be determined locally on the mobile device based on the first communication protocol and the second communication. In another embodiment, the mobile device may send information related to the first communication protocol and the second communication protocol to either the interface or the remote network, and in turn, the interface or the remote network may assist in identifying the a configuration ID or a target exchange communication protocol.

Figure 2:
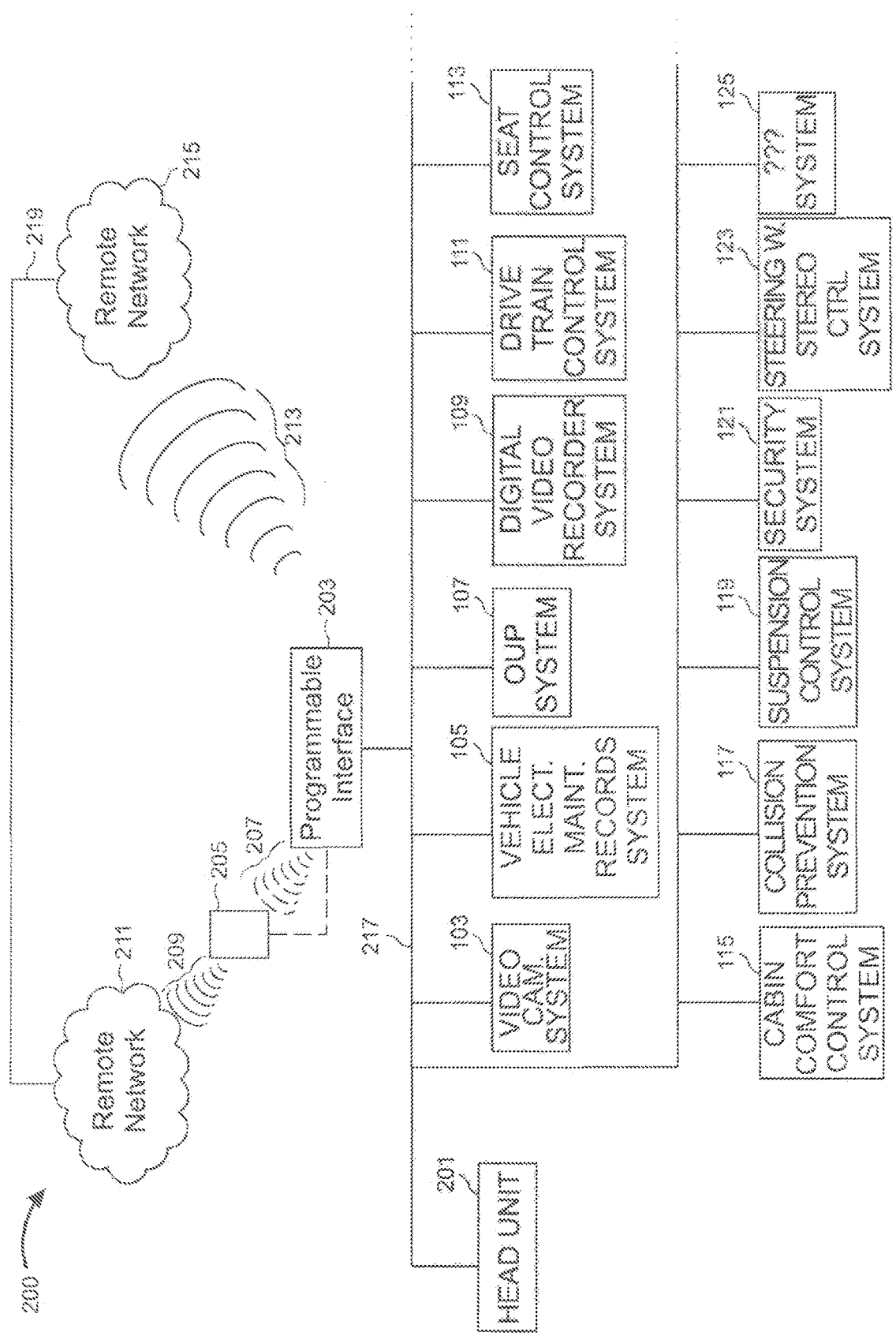
FIG. 2 shows illustrative apparatus in accordance with principles of the disclosure.

FIG. 2 shows illustrative arrangement 200. Arrangement 200 includes head unit 201. Head unit 201 may be an aftermarket head unit. Head unit 201 may be an OEM head unit. Head unit 201 may include one or more features of head unit 101 (shown in FIG. 1A) and/or head unit 129 (shown in FIG. 1B).

Vehicle communication system 217 provides communication pathways that link head unit 201 and peripheral devices 103-125. Arrangement 200 includes programmable interface 203. Interface 203 is connected to communication system 217. Interface 203 is connected to head unit 201 and peripheral devices 103-125 via communication system 217. In some embodiments, interface 203 may be directly connected to head unit 201 and/or one or more of peripheral devices 103-125.

Arrangement 200 shows that interface 203 may establish communication pathway 207 to mobile device 205. Mobile device may not be otherwise connected to communication system 217. Interface 205 may insulate mobile device 205 from accessing communication system 217. Communication pathway 207 may be a wired or wireless connection.

Arrangement 200 shows that mobile device 205 may be linked to remote network 211. Via mobile device 205 and remote network 211, interface may access an information exchange protocol stored on remote network 211. Interface 203 may connect to mobile device 205 when interface 203 detects a presence of mobile device 205.

Arrangement 200 also shows that interface 205 may include communication hardware that allows interface 205 to establish communication pathway 213 and connect directly to remote network 215. Interface may access an information exchange protocol stored on remote network 215. Remote network 211 may be linked to remote network 215 via communication pathway 219.

Figure 3:
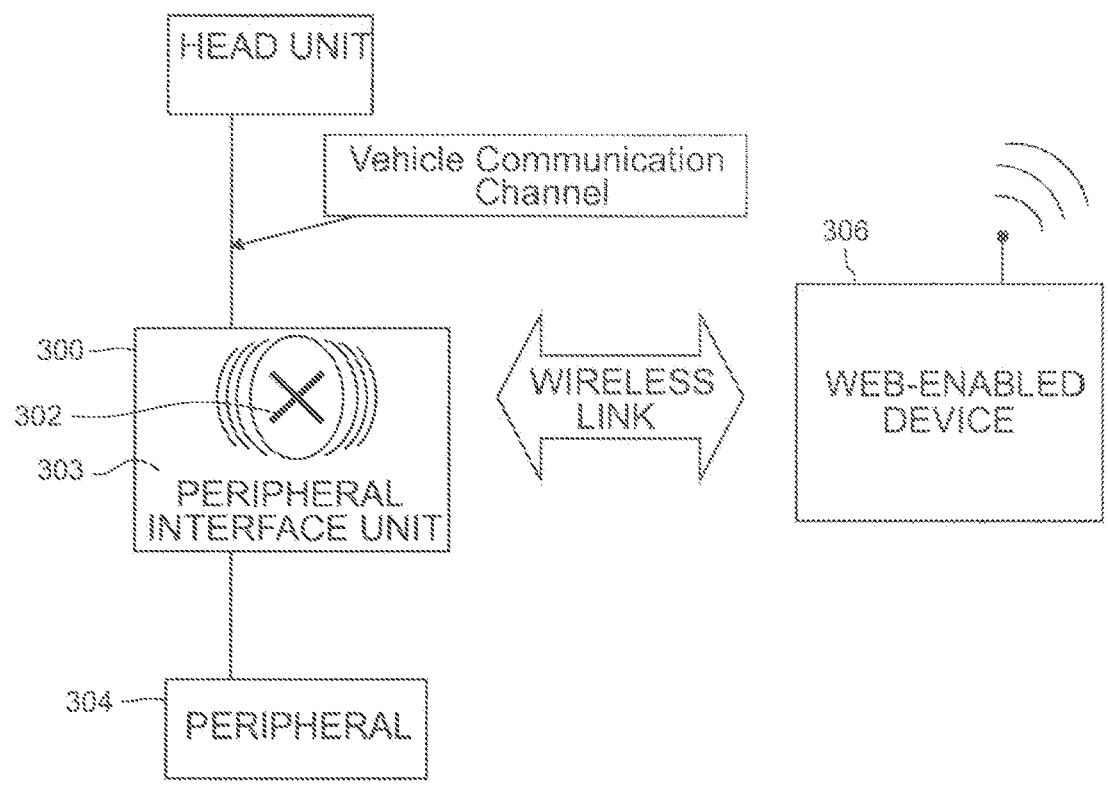
FIG. 3 shows illustrative apparatus in accordance with principles of the disclosure.

FIG. 3 shows illustrative Arrangement A-1 for interface unit 300. Interface unit 300 may include one or more features of interface 203 (shown in FIG. 2). Interface unit 300 may include interface 302. Interface unit 300 may include interface transceiver 303. Interface unit 300 may be placed between, and intercept bit packets that are exchanged between, the head unit and a peripheral, for example, peripheral 304. Interface unit 300 may intercept bit packets transmitted by one or more peripheral using a vehicle communication system, such as communication system 217 (shown in FIG. 2). Interface 302 may translate a packet from the head unit's protocol to the peripheral protocol. Interface 302 may translate a packet from the peripheral's protocol to the head unit's protocol.

Transceiver 303 may be linked, for example, by wireless communication, such as one or more of the implementations listed in Table 3, and any associated hardware, firmware, software and protocols, to web-enabled device 306, which may include a cell phone. An AM device installer may use the web-enabled device, in communication with the interface, to interact with the peripheral.

An AM device installer may use the web-enabled device, in communication with the interface, to identify the OEM protocol and the peripheral protocol and "flash" or download from a remote server a translator into the interface.

Transceiver 303 may harvest charge or current from the web-enabled device to power communication with the web-enabled device. Transceiver 303 may harvest charge or current from the vehicle electrical system to power communication with the web-enabled device.

Interface 300 may harvest charge or current from the web-enabled device to power communication with the web-enabled device. Interface 300 may harvest charge or current from the vehicle electrical system to power communication with the web-enabled device.

Figure 4:
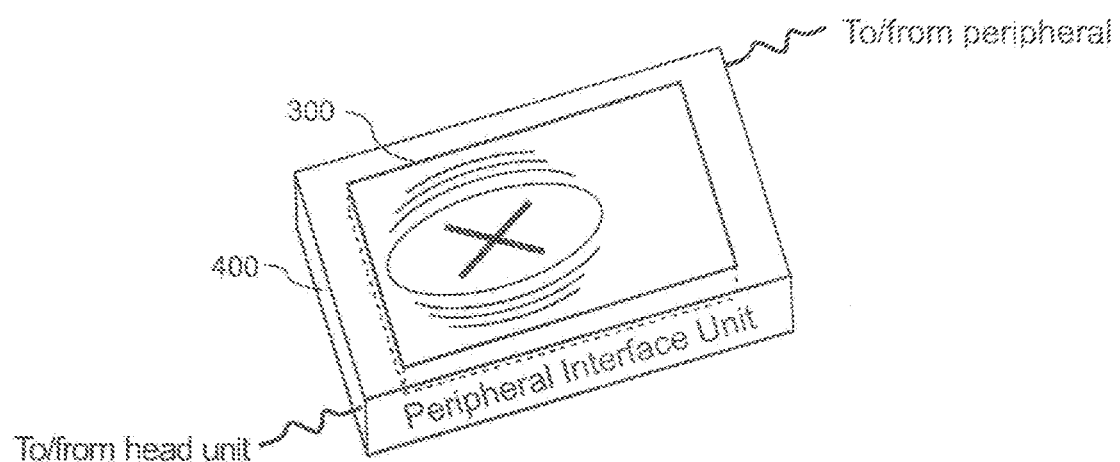
FIG. 4 shows illustrative apparatus in accordance with principles of the disclosure.

FIG. 4 is a perspective view showing interface unit 300 packaged in housing 400. Interface 300 may be situated in housing 400 in such a manner that interface transceiver 303 may be wirelessly engaged by a mobile device such as web-enabled device 306.

Figure 5:
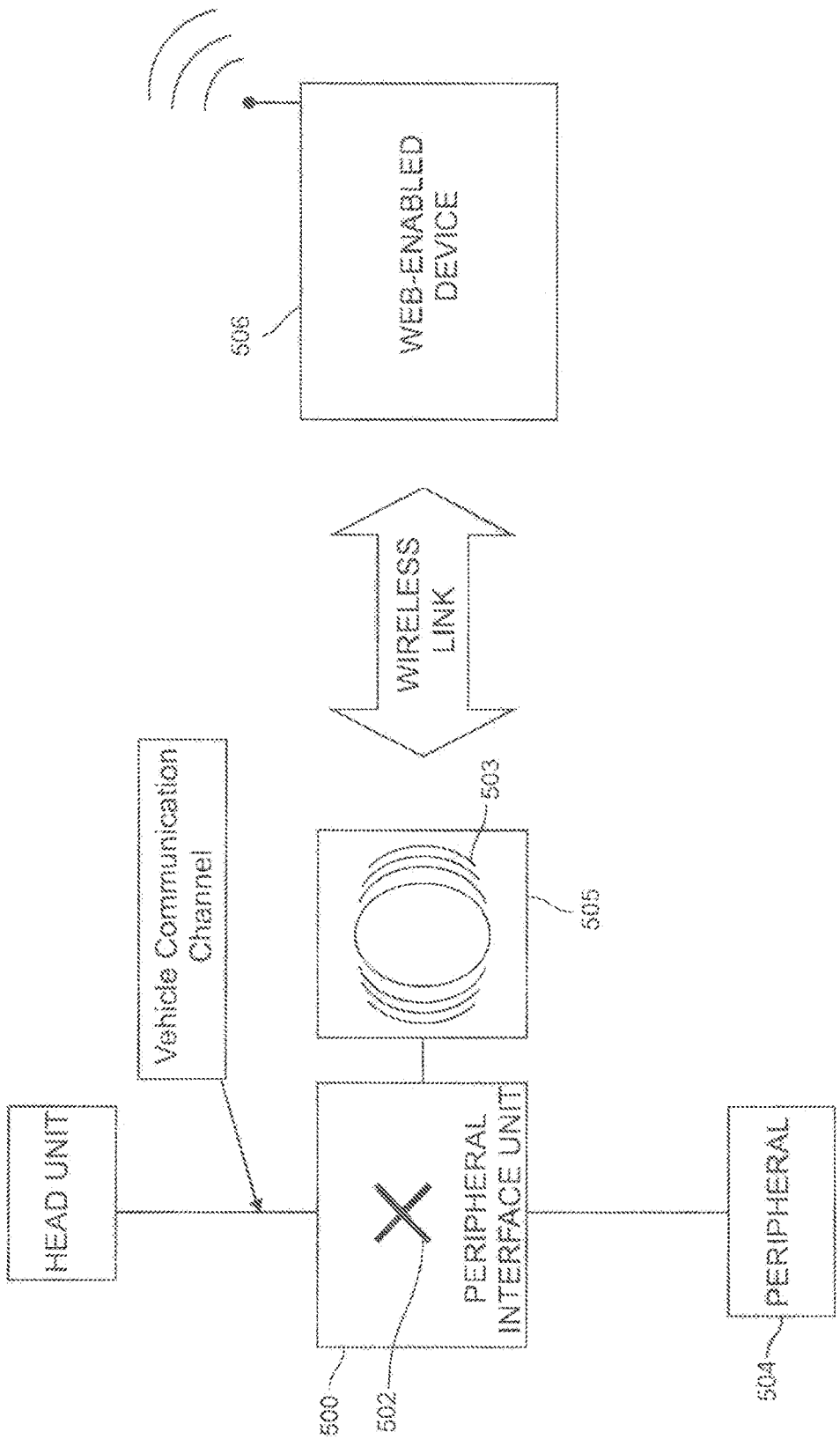
FIG. 5 shows illustrative apparatus in accordance with principles of the disclosure.

FIG. 5 shows illustrative Arrangement A-2 for interface unit 500. Interface unit 500 may include interface 502. Interface transceiver 503 may be disposed in peripheral interface communication unit 505. Communication unit 505 may be removably connected with interface unit 500. Communication unit 505 may be permanently connected with interface unit 500.

Interface unit 500 may be placed between, and intercept bit packets that are exchanged between, the head unit and a peripheral, for example, peripheral 504. Interface 502 may translate a packet from the head unit's protocol to the peripheral protocol. Interface 502 may translate a packet from the peripheral's protocol to the head unit's protocol.

Transceiver 503 may be linked, for example, by wireless communication, such as one or more of the implementations listed in Table 3, and any associated hardware, firmware, software and protocols, to web-enabled device 506, which may include a cell phone. An AM device installer may use the web-enabled device, in communication with the interface, to interact with the peripheral.

An AM device installer may use the web-enabled device, in communication with the interface, to identify the OEM protocol and the peripheral protocol and "flash" or download from a remote server a translator into the interface.

Transceiver 503 may harvest charge or current from the web-enabled device to power communication with the web-enabled device. Transceiver 503 may harvest charge or current from the vehicle electrical system to power communication with the web-enabled device.

Interface 500 may harvest charge or current from the web-enabled device to power communication with the web-enabled device. Interface 500 may harvest charge or current from the vehicle electrical system to power communication with the web-enabled device.

Figure 6:
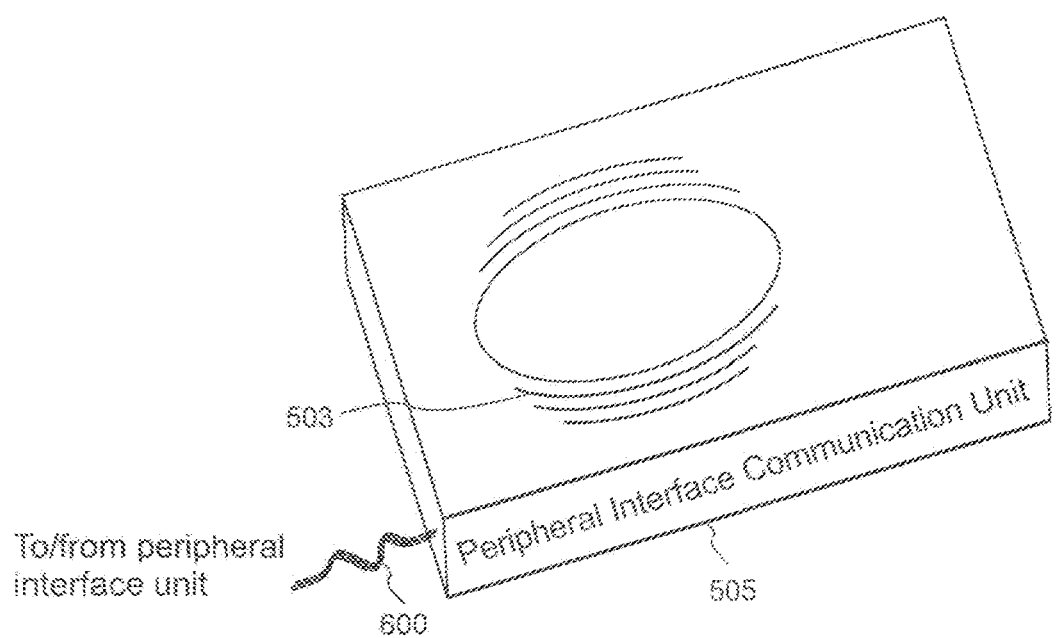
FIG. 6 shows illustrative apparatus in accordance with principles of the disclosure.

FIG. 6 is a perspective view showing transceiver 503 packaged in peripheral interface communication unit 500. Transceiver 503 may be situated in communication unit 500 in such a manner that transceiver 503 may be wirelessly engaged by a mobile device such as web-enabled device 506. Communication line 600 may be removably or permanently connected to a communication port on peripheral interface unit 500.

Figure 7:
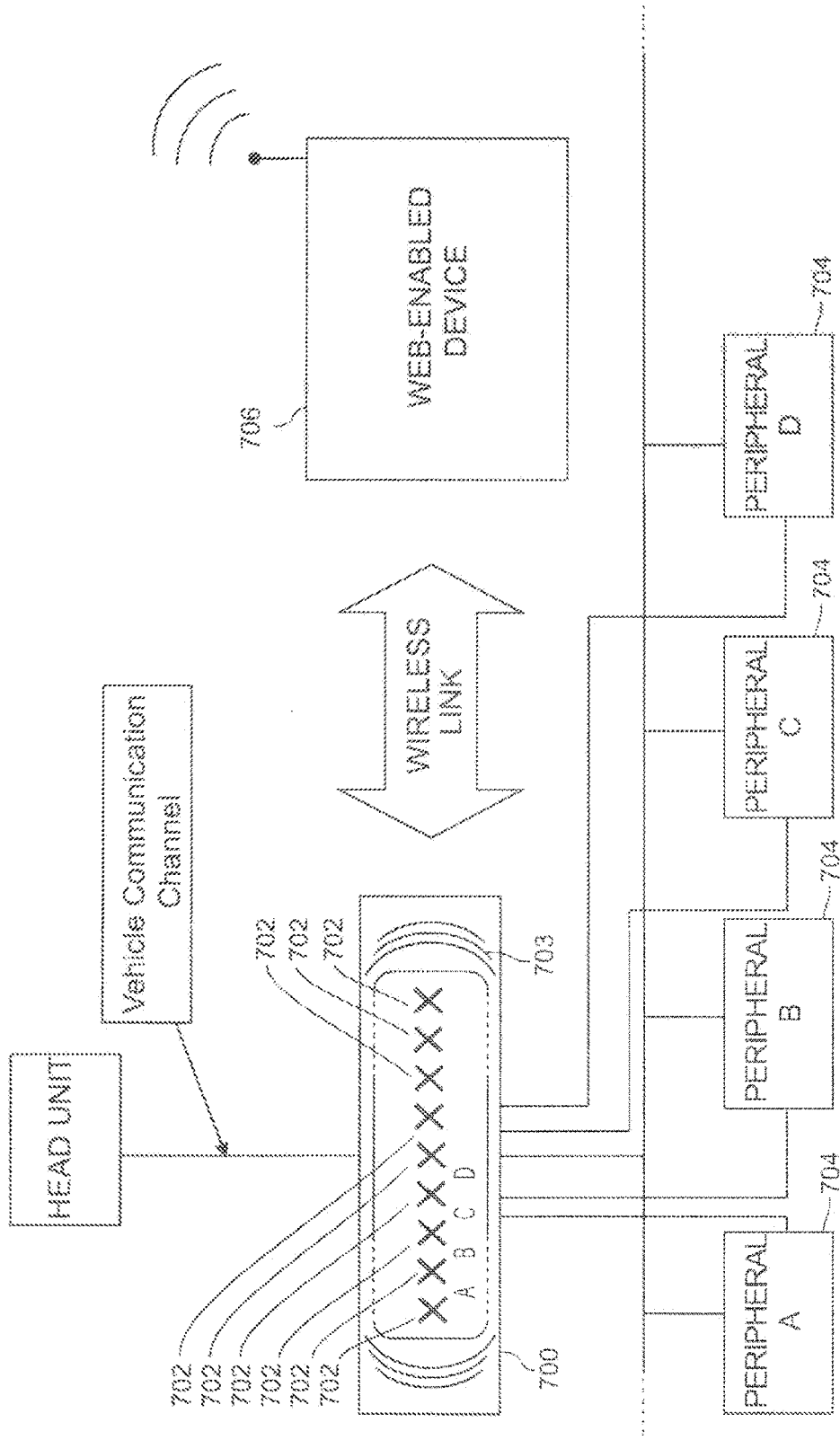
FIG. 7 shows illustrative apparatus in accordance with principles of the disclosure.

FIG. 7 shows illustrative Arrangement B-1 for interface unit 700. Interface unit 700 may include interfaces 702. Each of interfaces 702 may be associated with a communication port that communicates with a peripheral device. Each of interfaces 702 may correspond to a different peripheral. For example, interfaces A, B, C and D may correspond, respectively to peripherals A, B, C and D.

Interface unit 700 may include interface transceiver 703. Interface unit 700 may be placed between, and intercept bit packets that are exchanged between, the head unit and one or more of peripherals 704. Interfaces 702 may translate a packet from the head unit's protocol to a peripheral protocol. Interfaces 702 may translate a packet from a peripheral protocol to the head unit's protocol. Each of interfaces 702 may be associated with a different information exchange protocol. One or more of the information exchange protocols may be obtained via web-enabled device 706.

Transceiver 703 may be linked, for example, by wireless communication, such as one or more of the implementations listed in Table 3, and any associated hardware, firmware, software and protocols, to web-enabled device 706, which may include a cell phone. An AM device installer may use the web-enabled device, in communication with the interface, to interact with one or more of the peripherals.

An AM device installer may use web-enabled device 706, in communication with interface unit 700, to identify the OEM protocol and the peripheral protocol, and "flash" or download from a remote server a translator into interfaces 702 for the corresponding peripheral.

Transceiver 703 may harvest charge or current from the web-enabled device to power communication with the web-enabled device. Transceiver 703 may harvest charge or current from the vehicle electrical system to power communication with the web-enabled device.

Interface unit 700 may harvest charge or current from the web-enabled device to power communication with the web-enabled device. Interface unit 700 may harvest charge or current from the vehicle electrical system to power communication with the web-enabled device.

Figure 8:
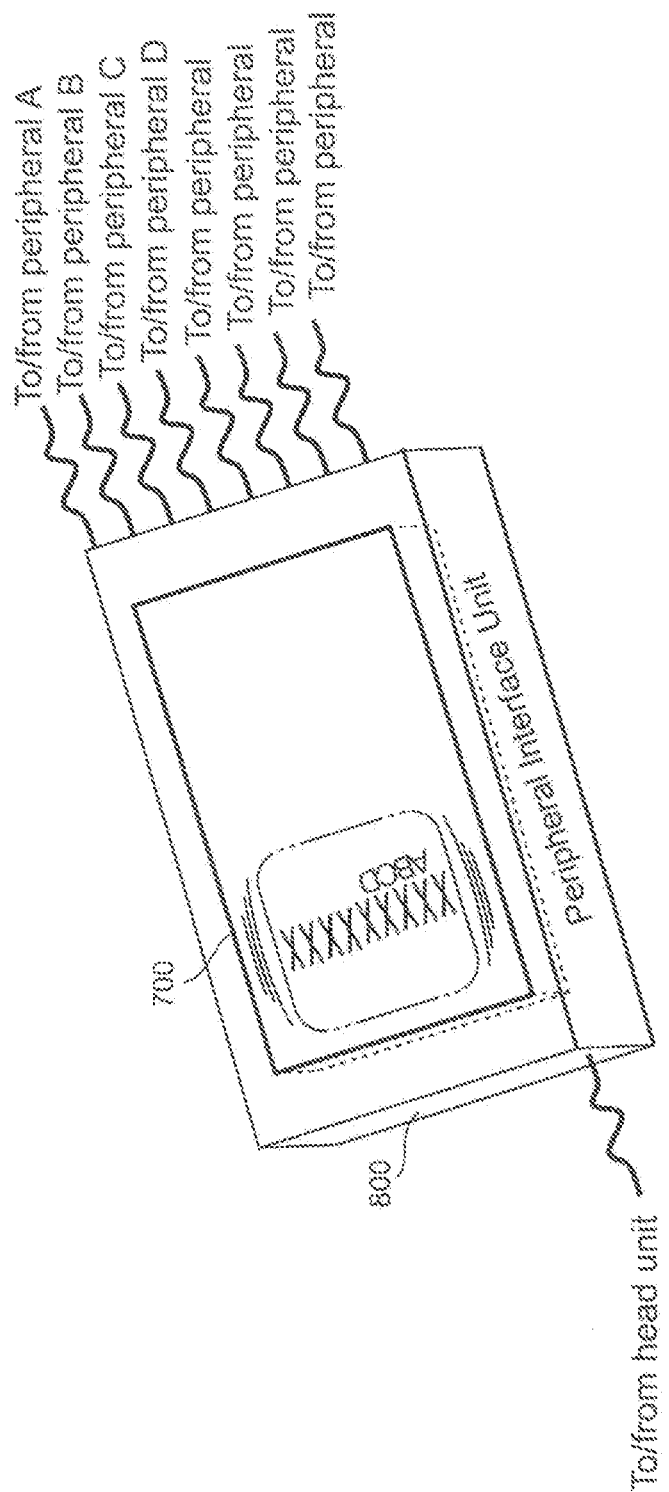
FIG. 8 shows illustrative apparatus in accordance with principles of the disclosure.

FIG. 8 is a perspective view showing interface unit 700 packaged in housing 800. Interface unit 700 may be situated in housing 800 in such a manner that interface transceiver 703 may be wirelessly engaged by a mobile device such as web-enabled device 706. Communication line 800 may be removably or permanently connected to a communication port on peripheral interface unit 700. Communication lines 802 may be removably or permanently connected to communication ports on the peripherals.

Figure 9:
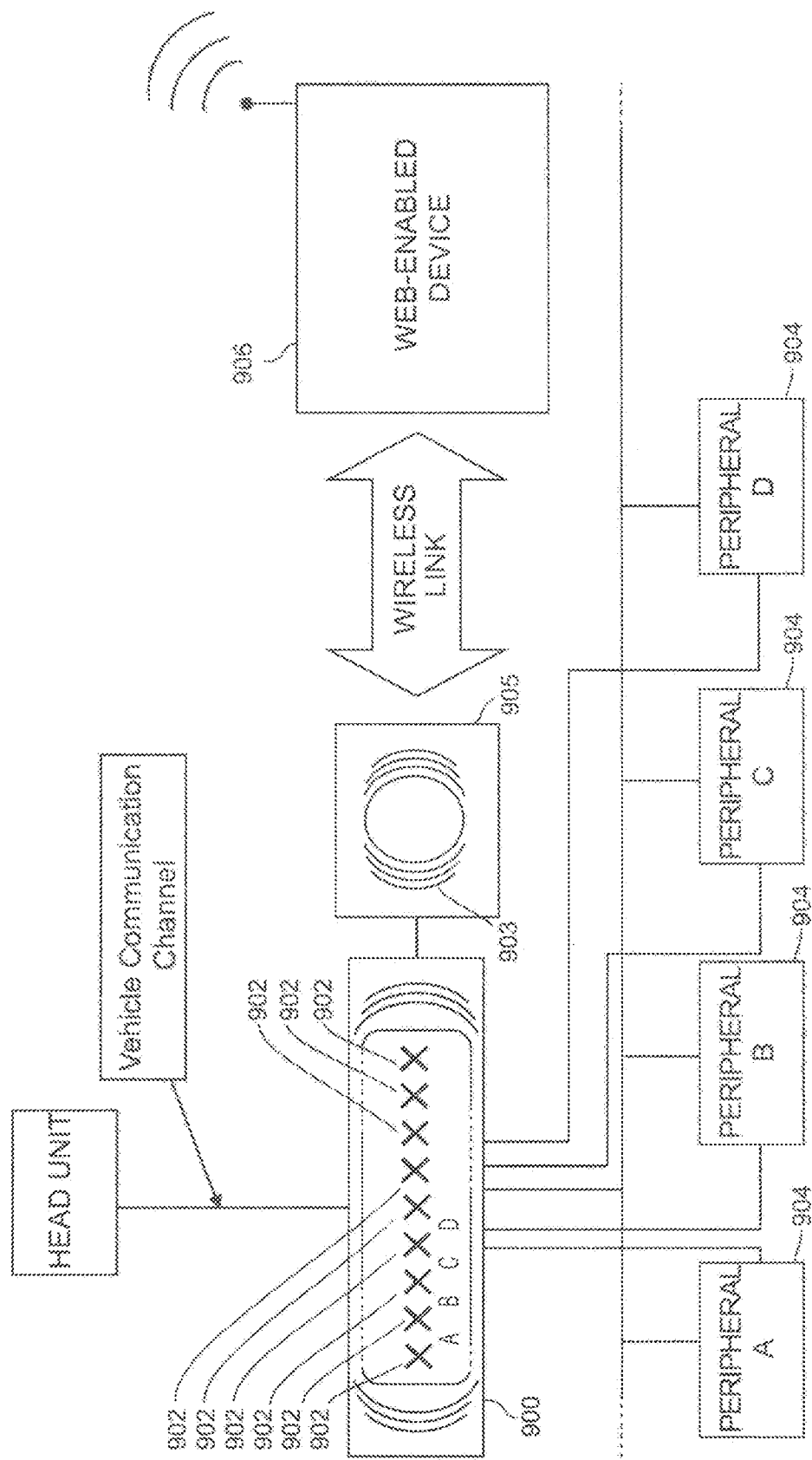
FIG. 9 shows illustrative apparatus in accordance with principles of the disclosure.

FIG. 9 shows illustrative Arrangement B-2 for interface unit 900. Interface unit 900 may include interfaces 902. Interface transceiver 903 may be disposed in peripheral interface communication unit 905. Communication unit 905 may be removably connected with interface unit 900. Communication unit 905 may be permanently connected with interface unit 900.

Interface unit 900 may be placed between, and intercept bit packets that are exchanged between, the head unit and one or more of peripherals 904. Interface 902 may translate a packet from the head unit's protocol to a peripheral protocol. Interface 902 may translate a packet from a peripheral's protocol to the head unit's protocol.

Transceiver 903 may be linked, for example, by wireless communication, such as one or more of the implementations listed in Table 3, and any associated hardware, firmware, software and protocols, to web-enabled device 906, which may include a cell phone. An AM device installer may use the web-enabled device, in communication with the interface, to interact with the one or more of peripherals 904.

An AM device installer may use the web-enabled device, in communication with the interface, to identify the OEM protocols and the peripheral protocols and "flash" or download from a remote server a translator into the interface.

Transceiver 903 may harvest charge or current from the web-enabled device to power communication with the web-enabled device. Transceiver 903 may harvest charge or current from the vehicle electrical system to power communication with the web-enabled device.

Interface 900 may harvest charge or current from the web-enabled device to power communication with the web-enabled device. Interface 900 may harvest charge or current from the vehicle electrical system to power communication with the web-enabled device.

Figure 10:
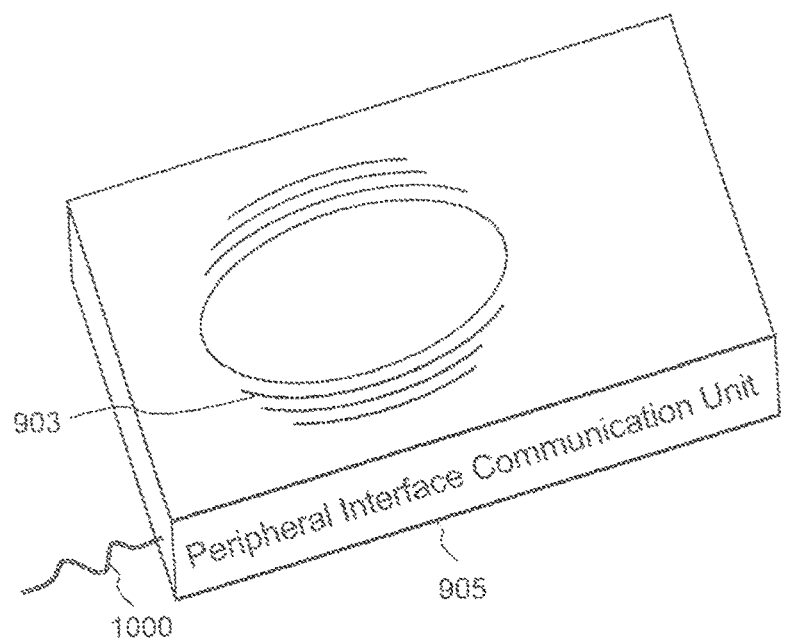
FIG. 10 shows illustrative apparatus in accordance with principles of the disclosure.

FIG. 10 is a perspective view showing transceiver 903 packaged in peripheral interface communication unit 900. Transceiver 903 may be situated in communication unit 900 in such a manner that transceiver 903 may be wirelessly engaged by a mobile device such as web-enabled device 906. Communication line 1000 may be removably or permanently connected to a communication port on peripheral interface unit 900.

Figure 11:
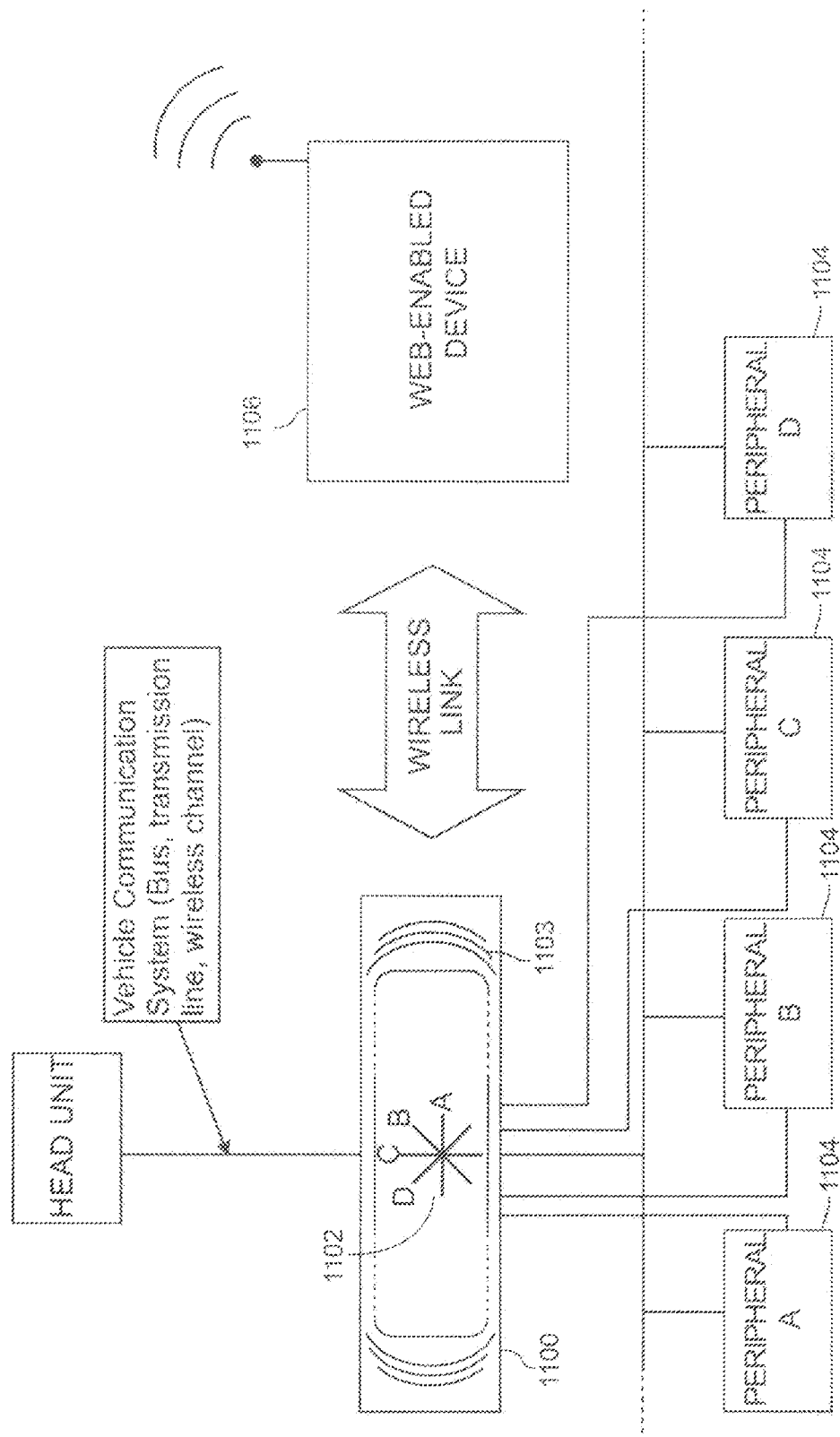
FIG. 11 shows illustrative apparatus in accordance with principles of the disclosure.

FIG. 11 shows illustrative Arrangement C-1 for interface unit 1100. Interface unit 1100 may include multi-device interface 1102. Interface 1102 may be configured to interface with one or more of peripherals 1104. Each of peripherals 1104 may require a protocol that is different from those of the others. Interface 1102 may interface with each of peripherals A, B, C and D.

Interface unit 1100 may include interface transceiver 1103. Interface unit 1100 may be placed between, and intercept bit packets that are exchanged between, the head unit and one or more of peripherals 1104. Interface 1102 may translate a packet from the head unit's protocol to a peripheral protocol. Interface 1102 may translate a packet from a peripheral protocol to the head unit's protocol.

Transceiver 1103 may be linked, for example, by wireless communication, such as one or more of the implementations listed in Table 3, and any associated hardware, firmware, software and protocols, to web-enabled device 1106, which may include a cell phone. An AM device installer may use the web-enabled device, in communication with the interface, to interact with one or more of the peripherals.

An AM device installer may use the web-enabled device, in communication with the interface, to identify the OEM protocol and the peripheral protocol, and "flash" or download from a remote server a translator into the interface for the corresponding peripheral.

Transceiver 1103 may harvest charge or current from the web-enabled device to power communication with the web-enabled device. Transceiver 1103 may harvest charge or current from the vehicle electrical system to power communication with the web-enabled device.

Interface 1100 may harvest charge or current from the web-enabled device to power communication with the web-enabled device. Interface 1100 may harvest charge or current from the vehicle electrical system to power communication with the web-enabled device.

Figure 12:
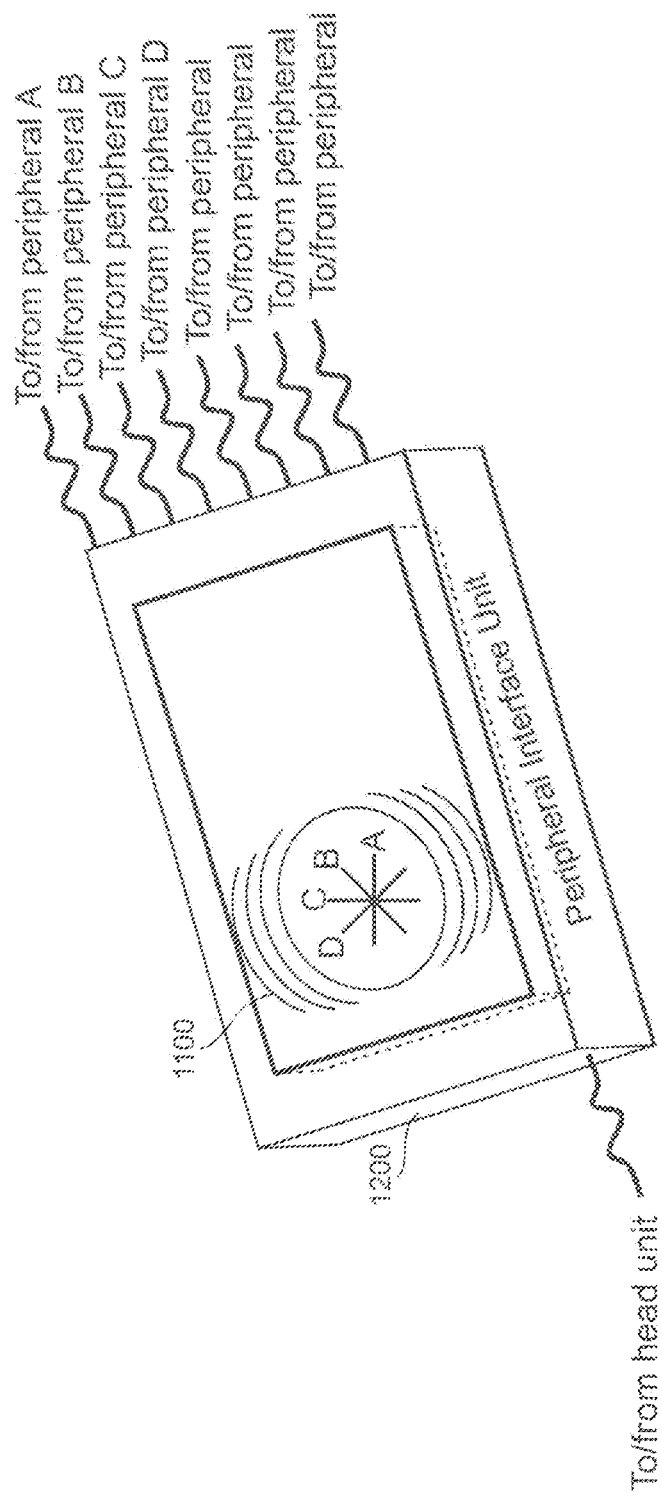
FIG. 12 shows illustrative apparatus in accordance with principles of the disclosure.

FIG. 12 is a perspective view showing interface unit 1100 packaged in housing 1200. Interface 1100 may be situated in housing 1200 in such a manner that interface transceiver 1103 may be wirelessly engaged by a mobile device such as web-enabled device 1106. Communication line 1200 may be removably or permanently connected to a communication port on peripheral interface unit 1100. Communication lines 1202 may be removably or permanently connected to communication ports on the peripherals.

Figure 13:
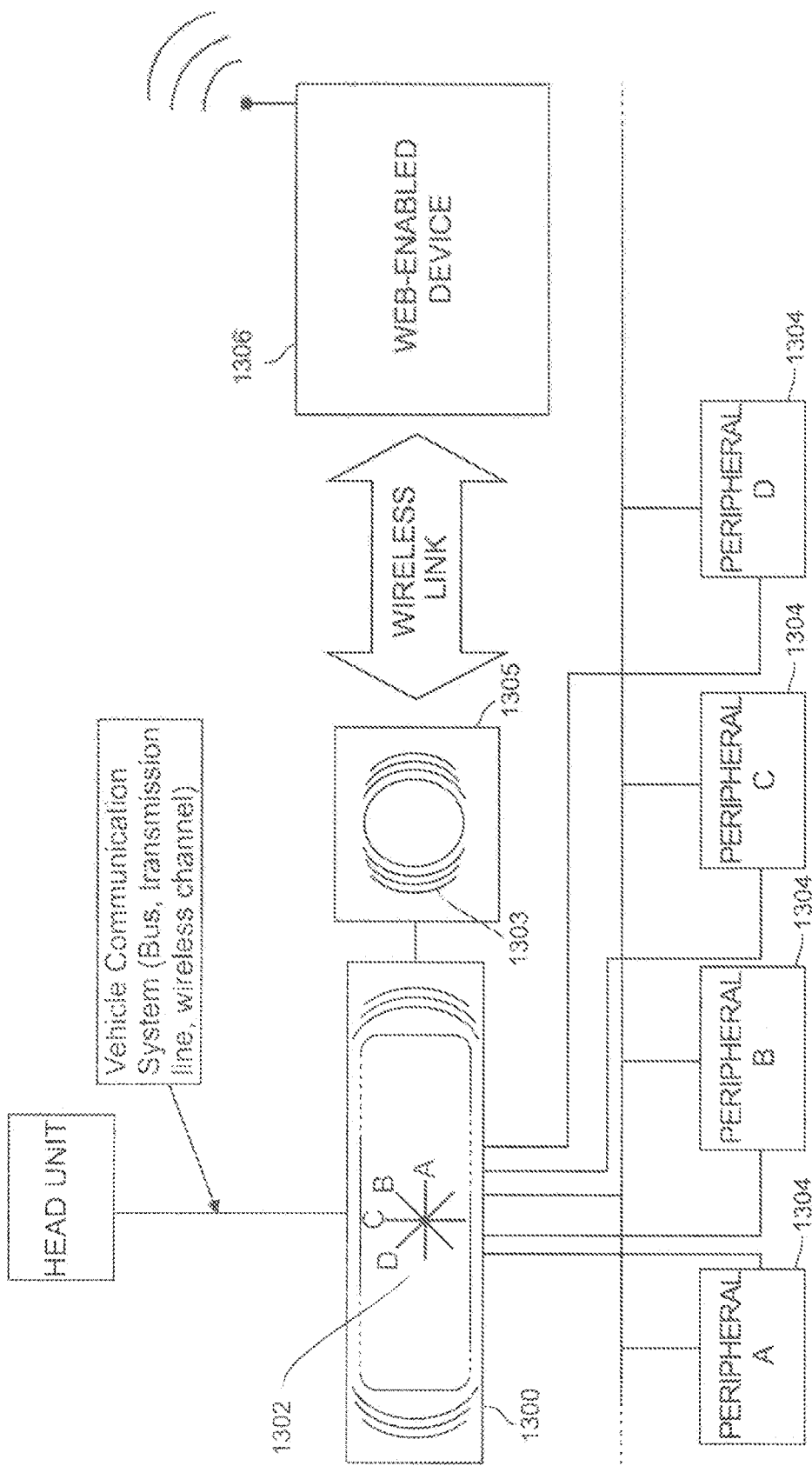
FIG. 13 shows illustrative apparatus in accordance with principles of the disclosure.

FIG. 13 shows illustrative Arrangement C-2 for interface unit 1300. Interface unit 1300 may include multi-device interface 1302. Interface transceiver 1303 may be disposed in peripheral interface communication unit 1305. Communication unit 1305 may be removably connected with interface unit 1300. Communication unit 1305 may be permanently connected with interface unit 1300.

Interface unit 1300 may be placed between, and intercept bit packets that are exchanged between, the head unit and one or more of peripherals 1304. Interface 1302 may translate a packet from the head unit's protocol to a peripheral protocol. Interface 1302 may translate a packet from a peripheral's protocol to the head unit's protocol.

Transceiver 1303 may be linked, for example, by wireless communication, such as one or more of the implementations listed in Table 3, and any associated hardware, firmware, software and protocols, to web-enabled device 1306, which may include a cell phone. An AM device installer may use the web-enabled device, in communication with the interface, to interact with the one or more of peripherals 1304.

An AM device installer may use the web-enabled device, in communication with the interface, to identify the OEM protocol and the peripheral protocol and "flash" or download from a remote server a translator into the interface.

Transceiver 1303 may harvest charge or current from the web-enabled device to power communication with the web-enabled device. Transceiver 1303 may harvest charge or current from the vehicle electrical system to power communication with the web-enabled device.

Interface 1300 may harvest charge or current from the web-enabled device to power communication with the web-enabled device. Interface 1300 may harvest charge or current from the vehicle electrical system to power communication with the web-enabled device.

Figure 14:
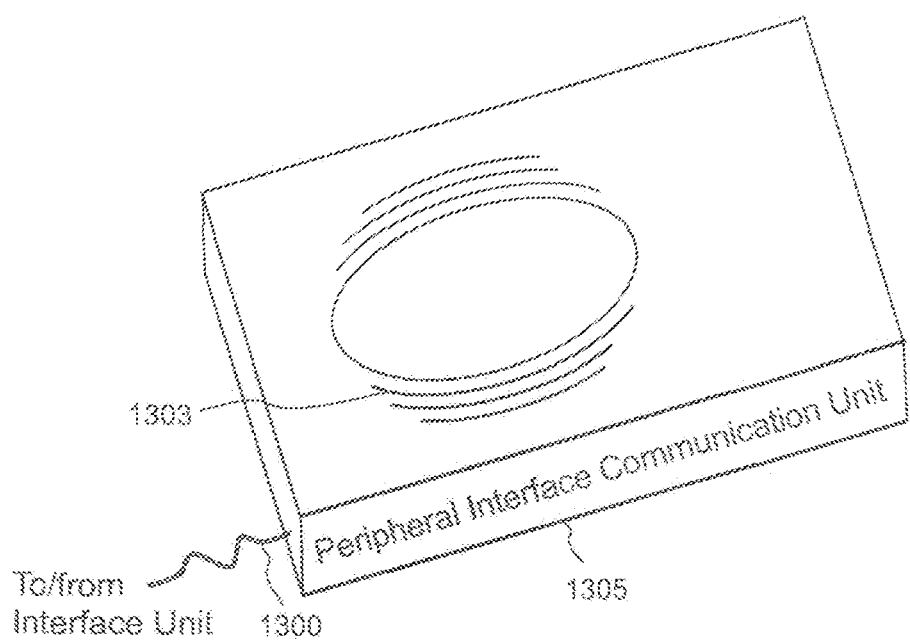
FIG. 14 shows illustrative apparatus in accordance with principles of the disclosure.

FIG. 14 is a perspective view showing transceiver 1303 packaged in peripheral interface communication unit 1305. Transceiver 1303 may be situated in communication unit 1305 in such a manner that transceiver 1303 may be wirelessly engaged by a mobile device such as web-enabled device 1306. Communication line 1400 may be removably or permanently connected to a communication port on peripheral interface unit 1300.

Figure 15:
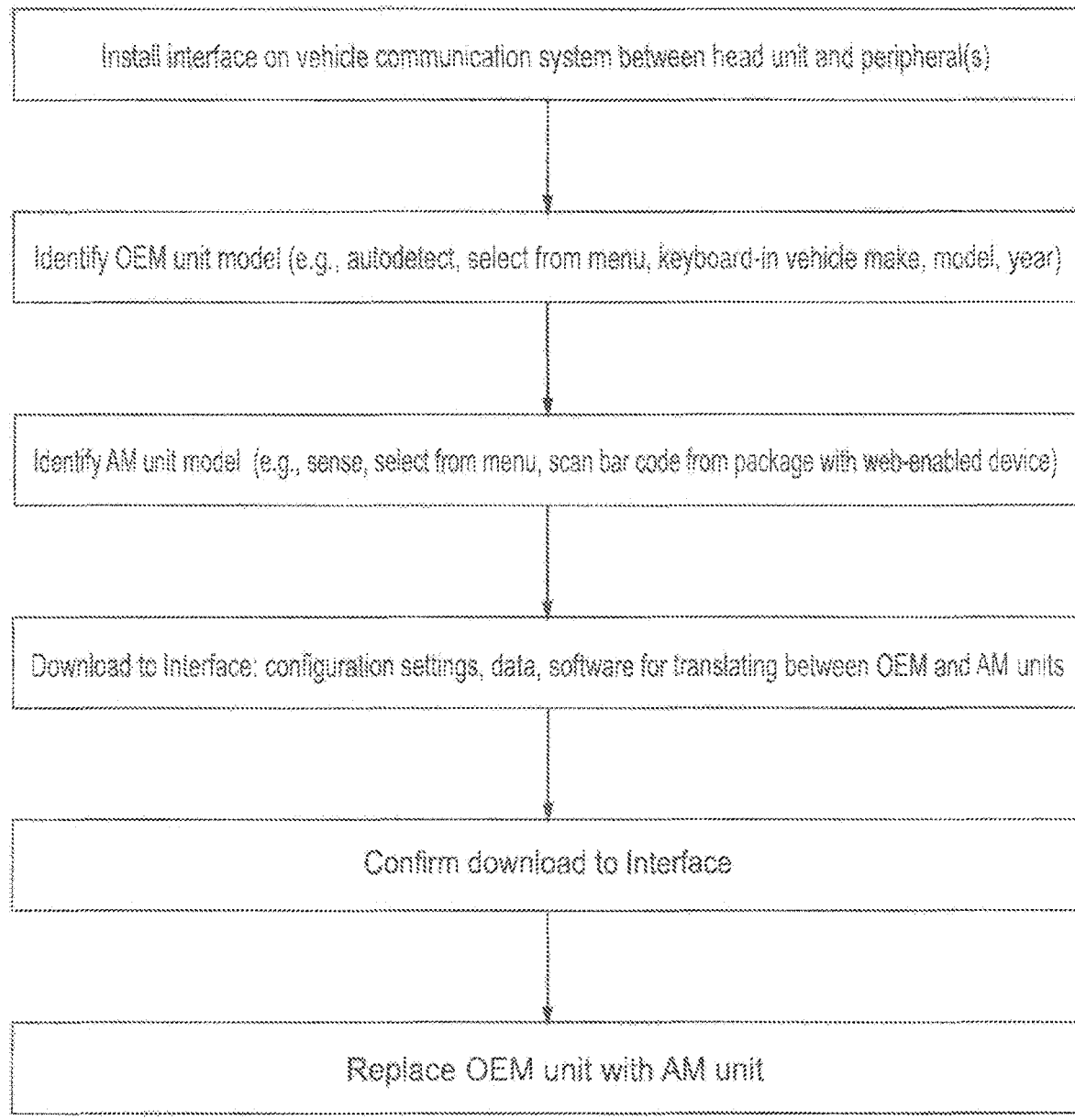
FIG. 15 shows an illustrative process in accordance with principles of the disclosure.

FIG. 15 shows illustrative steps that may be performed in accordance with the principles of the disclosure. The method shown in FIG. 15 includes the step of installing an interface on a vehicle communication system between a head unit and a peripheral device. The method includes the steps of identifying OEM unit model, such as the vehicle model or the peripheral model. The OEM unit may be identified by any of the following processes: an autodetection process, user selections from a menu (for example, on a user interface on a mobile phone), or user inputs from a keyboard in vehicle. The autodetection process may be executed using a first communication port, a second communication port, or a third communication port as described herein. The user selections may be input into a web-enabled device, such as an application on a mobile device, as described herein. The inputs may include the vehicle make, model, year, or any of the other data provided in Tables 4-6. Additionally, in some embodiments, the OEM unit may be identified by scanning a code, such as a barcode or VIN. The code may be scanned by a web-enabled device, such as a mobile phone.

The method further includes identifying an aftermarket unit, such as a radio head unit. The aftermarket unit may be identified via any of the following processes: auto sensing, user selections from a menu (for example, on a user interface on a mobile phone), or user inputs directly to the interface. The autodetection process may be executed using a first communication port, a second communication port, or a third communication port as described herein. The user selections may be input into a web-enabled device, such as an application on a mobile device, as described herein. The inputs may include the head unit model number, product number, or any of the other data provided in Tables 4-6. Additionally, in some embodiments, the aftermarket unit may be identified by scanning a code, such as a barcode on the unit or the package. The code may be scanned by a web-enabled device, such as a mobile phone.

The method further includes the step of downloading information to the interface to enable the interface to bridge the incompatibility of the first communication protocol and the second communication protocol. The downloaded information may include configuration settings, data, software for translating between OEM (i.e., vehicle or peripheral devices) and an AM unit (i.e., radio head unit). For example, the downloaded software may include a target information exchange protocol, as described herein. Similarly, the downloaded data may include a communication configuration ID identifying an appropriate target information exchange protocol to be executed by the interface to bridge the incompatibility.

The method may further include confirming that the information was successfully downloaded. The method may further include replacing an OEM unit (e.g., OEM head unit) with the AM unit (e.g., an aftermarket head unit).

Figure 16:
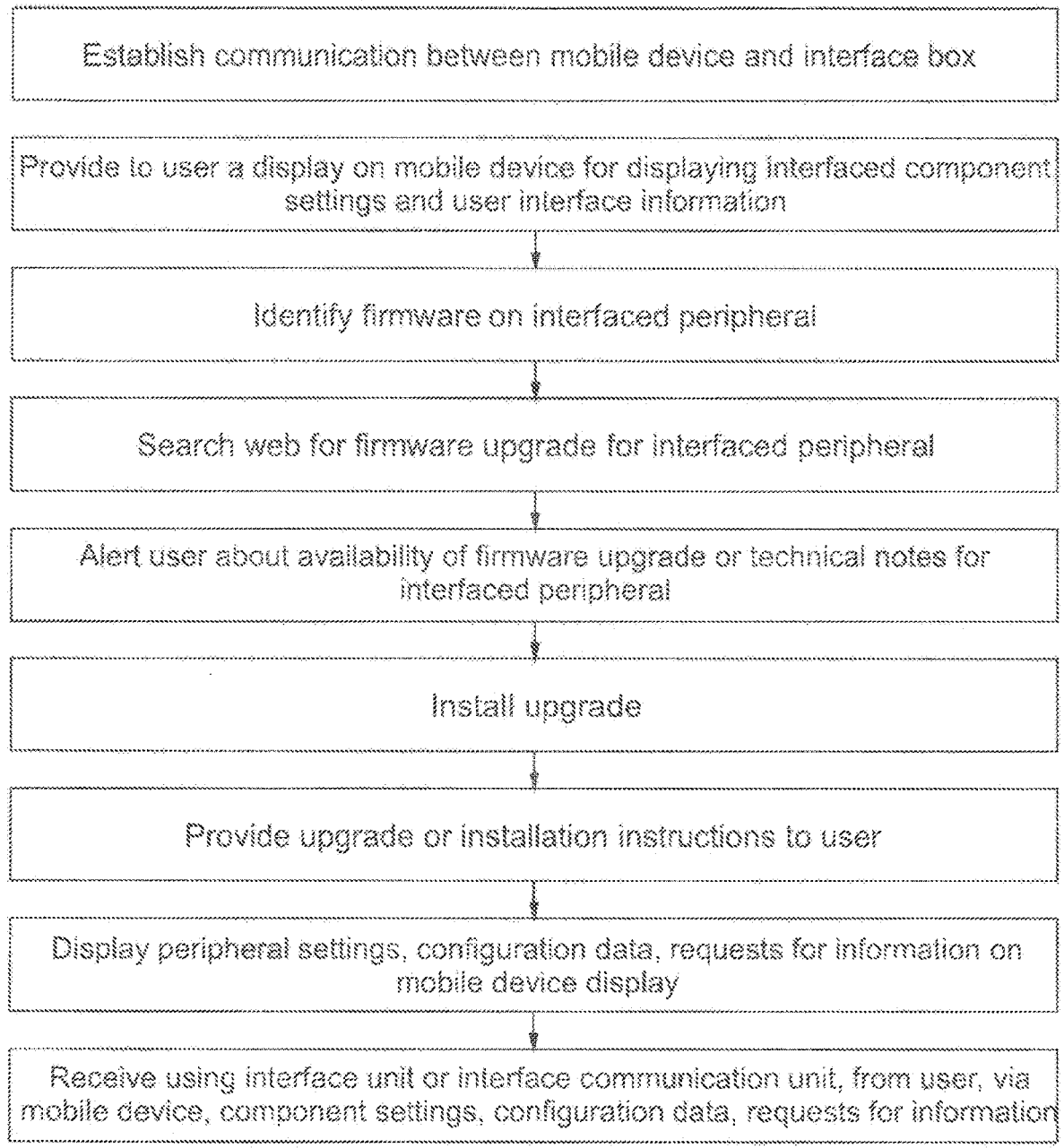
FIG. 16 shows illustrative apparatus in accordance with principles of the disclosure.

FIG. 16 shows other illustrative steps that may be may be performed in accordance with the principles of the disclosure. FIG. 16 includes the step of establishing communication between a mobile device and an interface. As described herein, the communication may be a form of wireless such as near field communication. The method of FIG. 16 further includes the step of providing, to a user, a display on a mobile device, such as a user interface or an application. The display may provide an interface for sending or receiving data from a user. The data may include component settings or user information, as described with respect to Tables 4-6. Based on the information communicated via the user interface, the method includes the step of identifying firmware on a interfaced peripheral. The method may further include the step of communicating with a remote network to identify firmware upgrade for the interfaced peripheral. In some embodiments, the method includes the step of alerting a user about the availability of the firmware upgrade or other technical notes related to the interfaced peripheral. The upgrade may then be installed on the interfaced peripheral. In some embodiments, the upgrade is installed via one or both the mobile device or the interface. Installing the upgrade may further include providing instructions to a user. The method may include the step of displaying peripheral settings, configuration data, or requests for information on the mobile device. Additionally, the method may include the step of receiving information such as component settings, configuration data, or requests for information. The information may be received from a user utilizing an interface unit or an interface communication unit. For example, the information may be input by a user into a user interface unit on a mobile device.

One or more of the functions and steps included in the methods of FIGS. 15 and 16 may be performed in various combinations by the interface, the mobile device, and a remote network in accordance with the principles of the disclosure. One or more of the steps of FIGS. 15 and 16 may be combined with each other or with other steps in accordance of the principles of the disclosure. One or more of the steps may be omitted from the processes shown in FIGS. 15 and 16.

Accordingly, the apparatus and methods described herein provide a system for communicating with at least one device or at least one sensor in a vehicle. The system comprises an interface module configured to bridge incompatibility of a radio head unit configured to communicate using a first communication protocol and a peripheral device configured to communication using a second communication protocol incompatible with the first communication protocol and allow the radio head unit to control the peripheral device using a vehicle communication system. The interface module comprises a first communication port for communicating with the radio head unit, a second communication port for communicating with the peripheral device, and a third communication port for communicating with a mobile device outside the vehicle or not installed in the vehicle. The interface module is configured to bridge the incompatibility by: identifying the first communication protocol used by the radio head unit, identifying the second communication protocol used by the peripheral device, and detecting a presence of the mobile device. In response to detecting the presence of the mobile device, via the mobile device, the interface may perform the steps of wirelessly accessing a remote network external to the vehicle, obtaining a communication configuration ID stored on a database accessible via the remote network, the configuration ID identifying a target information exchange protocol executable to bridge the incompatibility between the first communication protocol and the second communication protocol, and utilizing the identified target information exchange protocol to bridge the incompatibility between the first communication protocol and the second communication protocol.

The apparatus and methods described herein provide a system for communicating with at least one device or at least one sensor in a vehicle. The system comprises a first module configured to bridge incompatibility of a radio head unit configured to communicate using a first communication protocol and a peripheral device configured to communication using a second communication protocol incompatible with the first communication protocol. The first module comprises a first communication interface for communicating with the radio head unit, a second communication interface for communicating with the peripheral device, and a third communication interface for communicating with a mobile device. The first module is configured to bridge the incompatibility by executing the following steps wirelessly communicating with the mobile phone using near field communication, receiving, from the mobile phone, a signal identifying a target information exchange protocol executable to bridge the incompatibility between the first communication protocol and the second communication protocol, utilizing the identified target information exchange protocol to bridge the incompatibility between the first communication protocol and the second communication protocol, and allowing the radio head unit to control the peripheral device using a vehicle communication system. A second module is in communication with the first module. The second module is configured to identify the first communication protocol used by the radio head unit, identify the second communication protocol used by the peripheral device, and based on the first communication protocol and the second communication protocol, determining the target information exchange protocol executable to bridge the incompatibility between the first communication protocol and the second communication protocol.

The apparatus and methods described herein provide a method of bridging incompatibility of a radio head unit in a vehicle and a peripheral device configured to control a peripheral device in the vehicle. The method comprises receiving, from a first image sensor, a first scanned code identifying the vehicle, and receiving, from the first image sensor or a second image sensor, a second scanned code identifying the radio head unit. Based on the first scanned code, identifying a first communication protocol used by the peripheral device. Based on the second scanned code, identifying a second communication protocol used by the radio head unit. Based on the first communication protocol and the second communication protocol, determining a communication configuration ID identifying a target information exchange protocol executable to bridge the incompatibility between the first communication protocol and the second communication protocol. Additionally, the method includes the step of transmitting the communication configuration ID to an interface module, where the interface module is configured to execute the identified information exchange protocol to bridge the incompatibility between the first communication protocol and the second communication protocol.

Additionally, the system and methods provided herein further provide for wireless communication, including but not limited to near field communication and wifi communication. The apparatus and methods described herein provide for receiving user inputs via a user interface displayed on a mobile device. The apparatus and methods described herein provide for an interface capable of wireless harvesting power from a mobile device. The apparatus and methods described herein provide for receiving a signal identifying the target information exchange protocol by receiving a communication configuration ID from the mobile device, where the communication configuration ID identifies the target information exchange protocol. The apparatus and methods described herein provide for utilizing a database by wirelessly communicating with a remote network providing access to the database. The apparatus and methods described herein provide for identifying the first communication protocol by mapping a user input to the first communication protocol, where the user input includes at least one selected from the group consisting of a model number of the radio head unit and a scanned code identifying the radio head unit. The apparatus and methods described herein provide for identifying the second communication protocol by mapping a user input to the second communication protocol, where the user input includes at least one selected from the group consisting of a vehicle identification number of the vehicle, a make of the vehicle, a model of the vehicle, a year of the vehicle, and a scanned code identifying the vehicle. The apparatus and methods described herein provide for a second module where the second module determines the target information exchange protocol by utilizing a database mapping the first communication protocol and the second communication protocol to at least one of the target information exchange protocol, or a configuration ID indicative of the target information exchange protocol.

Thus, apparatus and methods for wireless configuration and programming of automotive aftermarket peripheral interfacing modules are provided. Persons skilled in the art will appreciate that the present disclosure can be practiced by other than the described embodiments, which are presented for purposes of illustration rather than of limitation. The present disclosure is limited only by the claims that follow.

What is claimed is:

1. A system for communicating with at least one device or at least one sensor in a vehicle, the system comprising:
   a programmable interface configured to bridge incompatibility of a radio head unit configured to communicate using a first communication protocol and a peripheral device configured to communicate using a second communication protocol incompatible with the first communication protocol and allow the radio head unit to control the peripheral device using a vehicle communication system, the programmable interface comprising:
   a first communication port for communicating with the radio head unit;
   a second communication port for communicating with the peripheral device; and
   a third communication port for communicating with a mobile device outside the vehicle or not installed in the vehicle;
   wherein the programmable interface is configured to bridge the incompatibility by:
      identifying the first communication protocol used by the radio head unit,
      identifying the second communication protocol used by the peripheral device,
      detecting a presence of the mobile device,
      in response to detecting the presence of the mobile device, via the mobile device, wirelessly accessing a remote network external to the vehicle,
      obtaining a communication configuration ID stored on a database accessible via the remote network, the configuration ID identifying a target information exchange protocol executable to bridge the incompatibility between the first communication protocol and the second communication protocol, and utilizing the identified target information exchange protocol to bridge the incompatibility between the first communication protocol and the second communication protocol.

2. The system of claim 1, wherein the programmable interface is further configured to wirelessly communicate with the mobile device via nearfield communication, and wherein the programmable interface is configured to wirelessly harvest power from the mobile device to power the interface module.

3. The system of claim 1, wherein at least one of the first communication port, the second communication port, and the third communication port is a wireless communication port.

4. The system of claim 1, wherein the programmable interface identifies at least one of the first communication protocol and the second communication protocol by receiving an input via a user interface displayed on the mobile device.

5. The system of claim 4, wherein the input includes at least one selected from the group consisting of a model number of the radio head unit and a scanned code identifying the radio head unit.

6. The system of claim 5, wherein the input includes at least one selected from the group consisting of a vehicle identification number of the vehicle, a make of the vehicle, a model of the vehicle, a year of the vehicle, and a scanned code identifying the vehicle.

7. The system of claim 1, wherein the programmable interface identifies at least one of the first communication protocol and the second communication protocol by auto detection of the radio head unit or the peripheral device via the first communication port or the second communication port, respectively.

8. A method of bridging incompatibility of a radio head unit in a vehicle and a peripheral device configured to control a peripheral device in the vehicle, the method comprising:
    identifying a first communication protocol used by the radio head unit;
    identifying a second communication protocol used by the peripheral device, the second communication protocol being incompatible with the first communication protocol;
    obtaining, with an interface module installed in the vehicle through communication with a mobile device outside the vehicle or not installed in the vehicle, a communication configuration ID, the communication configuration ID stored on a database accessible via a remote network external to the vehicle, the communication configuration ID identifying a target information exchange protocol executable to bridge the incompatibility between the first communication protocol and the second communication protocol; and
    utilizing, with the interface module, the target information exchange protocol identified by the communication configuration ID to bridge the incompatibility between the first communication protocol and the second communication protocol.

9. The method of claim 8, wherein identifying the first communication protocol includes identifying the first communication protocol with the interface module.

10. The method of claim 8, wherein identifying the second communication protocol includes identifying the second communication protocol with the interface module.

11. The method of claim 8, wherein identifying at least one of the first communication protocol and the second communication protocol includes receiving an input via a user interface.

12. The method of claim 11, wherein receiving the input via the user interface includes receiving the input from the user interface displayed on the mobile device.

13. The method of claim 11, wherein the input includes at least one selected from a group consisting of a model number of the radio head unit and a scanned code identifying the radio head unit.

14. The method of claim 11, wherein the input includes at least one selected from the group consisting of a vehicle identification number of the vehicle, a make of the vehicle, a model of the vehicle, a year of the vehicle, and a scanned code identifying the vehicle.

15. The method of claim 8, wherein identifying the first communication protocol includes identifying the first communication protocol by auto detection of the radio heat unit with the interface module.

16. The method of claim 8, wherein identifying the second communication protocol includes identifying the second communication protocol by auto detection of the peripheral device with the interface module.

17. The method of claim 8, wherein identifying the first communication protocol includes identifying the first communication protocol using a first communication port of the interface module.

18. The method of claim 17, wherein identifying the second communication protocol includes identifying the second communication protocol using a second communication port of the interface module.

19. The method of claim 18, wherein obtaining the communication configuration ID includes obtaining the communication configuration ID through communication with the mobile device via a third communication port of the interface module.

20. The method of claim 8, wherein obtaining the communication configuration ID includes obtaining the communication configuration ID from the mobile device via nearfield communication.

21. The method of claim 8, further comprising wirelessly harvesting power, with the interface module, from the mobile device.

22. The method of claim 8, wherein utilizing the identified target information exchange protocol to bridge the incompatibility between the first communication protocol and the second communication protocol includes intercepting information transmitted by the radio head unit in the first communication protocol, translating the intercepted information into the second communication protocol using the target information exchange protocol, and pushing the translated intercepted information onto a vehicle communication system.

23. The method of claim 8, wherein utilizing the identified target information exchange protocol to bridge the incompatibility between the first communication protocol and the second communication protocol includes intercepting information transmitted by the peripheral device in the second communication protocol, translating the intercepted information into the first communication protocol using the target information exchange protocol, and pushing the translated intercepted information onto a vehicle communication system.

24. The method of claim 8, wherein obtaining the communication configuration ID includes:
    detecting a presence of the mobile device, in response to detecting the presence of the mobile device, wirelessly accessing, via the mobile device, the remote network external to the vehicle, and obtaining the communication configuration ID from the database accessible via the remote network external to the vehicle.

\* \* \* \* \*